United States Patent
Holmes

(10) Patent No.: US 10,341,603 B2
(45) Date of Patent: Jul. 2, 2019

(54) IDENTIFYING AND TRACKING DIGITAL IMAGES WITH CUSTOMIZED METADATA

(71) Applicant: Lifetouch Inc., Eden Prairie, MN (US)

(72) Inventor: Jon A. Holmes, Eden Prairie, MN (US)

(73) Assignee: Lifetouch Inc., Eden Prairie, MN (US)

( * ) Notice: Subject to any disclaimer, the term of this patent is extended or adjusted under 35 U.S.C. 154(b) by 2 days.

(21) Appl. No.: 15/888,151

(22) Filed: Feb. 5, 2018

(65) Prior Publication Data

US 2018/0234659 A1 Aug. 16, 2018

Related U.S. Application Data

(63) Continuation of application No. 14/611,545, filed on Feb. 2, 2015, now Pat. No. 9,924,128, which is a continuation of application No. 14/102,567, filed on Dec. 11, 2013, now abandoned, which is a continuation of application No. 12/729,898, filed on Mar. 23, 2010, now Pat. No. 8,619,157, which is a continuation of application No. 11/441,904, filed on May 26, 2006, now Pat. No. 7,714,908.

(51) Int. Cl.
| | |
|---|---|
| *H04N 5/77* | (2006.01) |
| *G06F 17/30* | (2006.01) |
| *G06F 16/51* | (2019.01) |
| *H04N 9/82* | (2006.01) |
| *H04N 5/232* | (2006.01) |

(52) U.S. Cl.
CPC ............... *H04N 5/77* (2013.01); *G06F 16/51* (2019.01); *H04N 5/232* (2013.01); *H04N 5/772* (2013.01); *H04N 9/8205* (2013.01)

(58) Field of Classification Search
CPC ...... H04N 5/232; H04N 5/772; H04N 9/8205; G06F 17/3028
See application file for complete search history.

(56) References Cited

U.S. PATENT DOCUMENTS

| | | |
|---|---|---|
| 4,062,026 A | 12/1977 | Fujita |
| 4,251,156 A | 2/1981 | Zimmerman et al. |
| 4,269,495 A | 5/1981 | Dearing |

(Continued)

OTHER PUBLICATIONS

"SiRF: NMEA Reference Manual", Jan. 2005. (Year: 2005).*

(Continued)

*Primary Examiner* — Chia Wei A Chen
*Assistant Examiner* — Chriss S Yoder, III
(74) *Attorney, Agent, or Firm* — Merchant & Gould P.C.

(57) ABSTRACT

A method of tracking digital images includes inputting data identifying a subject of an image into a camera, acquiring an image with the camera, and storing the image and the inputted data, as metadata, in an image file when the image is acquired. The method can be implemented using a scanner, a digital camera, and a data processor. The scanner obtains the identifying data and transmits the data to the camera. The camera obtains digital images and embeds the data into digital image files encoding the digital images. The identifying data has a format different from any of the formats processable by the digital camera. The data processor converts the format of the identifying data to one of the plurality of formats processable by the digital camera loads the converted information into the digital camera as metadata.

20 Claims, 17 Drawing Sheets

(56) References Cited

U.S. PATENT DOCUMENTS

| | | |
|---|---|---|
| 4,330,186 A | 5/1982 | Hattori |
| 4,422,745 A | 12/1983 | Hopson |
| 4,664,491 A | 5/1987 | Kazumi et al. |
| 4,668,984 A | 5/1987 | Rosenfeld |
| 4,671,648 A | 6/1987 | Watanabe et al. |
| 4,714,332 A | 12/1987 | Eguchi et al. |
| 4,718,758 A | 1/1988 | Kawamura et al. |
| 4,736,224 A | 4/1988 | Watanabe et al. |
| 4,760,428 A | 7/1988 | Watanabe et al. |
| 4,780,735 A | 10/1988 | Taniguchi et al. |
| 4,814,802 A | 3/1989 | Ogawa |
| 4,843,418 A | 6/1989 | Taniguchi et al. |
| 4,854,696 A | 8/1989 | Guez |
| 4,860,039 A | 8/1989 | Hata et al. |
| 4,862,201 A | 8/1989 | Taniguchi et al. |
| 4,864,229 A | 9/1989 | Lauks et al. |
| 4,938,585 A | 7/1990 | Weiffenbach et al. |
| 4,943,825 A | 7/1990 | Taniguchi et al. |
| 4,963,917 A | 10/1990 | Taniguchi et al. |
| 5,021,820 A | 6/1991 | Robison et al. |
| 5,028,942 A | 7/1991 | Kirigaya |
| 5,030,979 A | 7/1991 | Kobayashi et al. |
| 5,060,006 A | 10/1991 | Taniguchi et al. |
| 5,107,290 A | 4/1992 | Ohsawa |
| 5,124,735 A | 6/1992 | Tsukahara et al. |
| 5,128,519 A | 7/1992 | Tokuda |
| 5,150,147 A | 9/1992 | Kobayshi et al. |
| 5,179,266 A | 1/1993 | Imamura |
| 5,181,060 A | 1/1993 | Kobayshi et al. |
| 5,227,837 A | 7/1993 | Terashita |
| 5,255,031 A | 10/1993 | Ikenoue |
| 5,260,740 A | 11/1993 | Seto |
| 5,267,042 A | 11/1993 | Tsuchiya et al. |
| 5,274,408 A | 12/1993 | Fujisawa et al. |
| 5,289,216 A | 2/1994 | Ohsawa et al. |
| 5,311,228 A | 5/1994 | Stoneham et al. |
| 5,369,463 A | 11/1994 | Terashita et al. |
| 5,371,561 A | 12/1994 | Sato et al. |
| 5,404,196 A | 4/1995 | Terashita et al. |
| 5,422,694 A | 6/1995 | Yoshida et al. |
| 5,471,266 A | 11/1995 | Satou |
| 5,479,226 A | 12/1995 | Kazami et al. |
| 5,525,459 A | 6/1996 | Peterson |
| 5,526,078 A | 6/1996 | Itoh et al. |
| 5,530,501 A | 6/1996 | Bell |
| 5,532,774 A | 7/1996 | Ootsuka |
| 5,555,047 A | 9/1996 | Tsuji et al. |
| 5,583,592 A | 12/1996 | Kato et al. |
| 5,614,969 A | 3/1997 | Izukawa |
| 5,617,162 A | 4/1997 | Kato et al. |
| 5,634,156 A | 5/1997 | Teremy et al. |
| 5,646,713 A | 7/1997 | Powers et al. |
| 5,649,247 A | 7/1997 | Itoh et al. |
| 5,664,248 A | 9/1997 | Naka et al. |
| 5,666,578 A | 9/1997 | Oikawa et al. |
| 5,701,530 A | 12/1997 | Fujino |
| 5,721,991 A | 2/1998 | Saito et al. |
| 5,729,777 A | 3/1998 | Saito et al. |
| 5,729,784 A | 3/1998 | Naka et al. |
| 5,734,941 A | 3/1998 | Teremy et al. |
| 5,740,484 A | 4/1998 | Miyazaki et al. |
| 5,745,811 A | 4/1998 | Okino et al. |
| 5,748,783 A | 5/1998 | Rhoads |
| 5,751,172 A | 5/1998 | Takano |
| 5,822,436 A | 10/1998 | Rhoads |
| 5,845,164 A | 12/1998 | Amano |
| 5,862,421 A | 1/1999 | Suzuki et al. |
| 5,895,135 A | 4/1999 | Funaki |
| 5,896,403 A | 4/1999 | Nagasaki et al. |
| 5,937,218 A | 8/1999 | Amano et al. |
| 5,946,444 A | 8/1999 | Evans et al. |
| 5,963,513 A | 10/1999 | Lemelson |
| 5,974,267 A | 10/1999 | Motomura |
| 5,975,771 A | 11/1999 | Ogiwara |
| 5,991,550 A | 11/1999 | Sasagaki et al. |
| 5,995,768 A | 11/1999 | Kitagawa et al. |
| 6,018,633 A | 1/2000 | Miyamoto et al. |
| 6,038,408 A | 3/2000 | Constable |
| 6,052,536 A | 4/2000 | Arai et al. |
| 6,052,813 A | 4/2000 | Nagasaki et al. |
| 6,058,498 A | 5/2000 | Nagasaki et al. |
| 6,064,832 A | 5/2000 | Sato et al. |
| 6,115,717 A | 9/2000 | Mehrotra et al. |
| 6,122,520 A | 9/2000 | Want et al. |
| 6,151,456 A | 11/2000 | Saito et al. |
| 6,179,494 B1 | 1/2001 | Egawa |
| 6,180,312 B1 | 1/2001 | Edwards |
| 6,181,880 B1 | 1/2001 | Ishihara et al. |
| 6,188,848 B1 | 2/2001 | Takahashi |
| 6,195,507 B1 | 2/2001 | Ito et al. |
| 6,205,296 B1 | 3/2001 | Hamada et al. |
| 6,249,397 B1 | 6/2001 | Sasaki |
| 6,256,084 B1 | 7/2001 | Saito et al. |
| 6,270,932 B2 | 8/2001 | Tatsumi et al. |
| 6,280,914 B1 | 8/2001 | Keech et al. |
| 6,282,362 B1 | 8/2001 | Murphy et al. |
| 6,321,040 B1 | 11/2001 | Wess et al. |
| 6,324,345 B1 | 11/2001 | Enomoto |
| 6,334,031 B1 | 12/2001 | Takahashi |
| 6,396,537 B1 | 5/2002 | Squilla et al. |
| 6,407,767 B1 | 6/2002 | Klees et al. |
| 6,429,924 B1 | 8/2002 | Milch |
| 6,553,187 B2 | 4/2003 | Jones |
| 6,587,839 B1 | 7/2003 | McIntyre et al. |
| 6,608,563 B2 | 8/2003 | Weston et al. |
| 6,629,104 B1 | 9/2003 | Parulski et al. |
| 6,672,508 B2 | 1/2004 | Kaye |
| 6,674,923 B1 | 1/2004 | Shih et al. |
| 6,745,186 B1 | 6/2004 | Testa et al. |
| 6,950,800 B1 | 9/2005 | McIntyre et al. |
| 7,251,048 B2 | 7/2007 | Cheatle et al. |
| 7,347,373 B2 | 3/2008 | Singh |
| 7,714,908 B2 | 5/2010 | Holmes |
| 7,797,337 B2 | 9/2010 | Fry |
| 8,619,157 B2 | 12/2013 | Holmes |
| 2002/0101519 A1 | 8/2002 | Myers |
| 2002/0164160 A1 | 11/2002 | Fredlund et al. |
| 2003/0133159 A1 | 7/2003 | Grosso et al. |
| 2003/0161009 A1 | 8/2003 | Yokoo et al. |
| 2004/0036774 A1 | 2/2004 | Nichols et al. |
| 2004/0066455 A1* | 4/2004 | Holmes ............... H04N 1/00132 348/207.1 |
| 2004/0135902 A1* | 7/2004 | Steensma .......... G06F 17/30265 348/231.99 |
| 2004/0189807 A1 | 9/2004 | Smith |
| 2005/0036034 A1* | 2/2005 | Rea .................... H04N 1/00281 348/207.1 |
| 2005/0038794 A1 | 2/2005 | Piersol |
| 2005/0104976 A1 | 5/2005 | Currans |
| 2005/0134707 A1* | 6/2005 | Perotti ............... H04N 1/00342 348/239 |
| 2005/0270381 A1 | 12/2005 | Owens et al. |
| 2006/0203312 A1 | 9/2006 | Van De Sluis et al. |
| 2007/0073770 A1 | 3/2007 | Morris et al. |
| 2008/0117309 A1 | 5/2008 | Jeon |
| 2014/0267830 A1 | 9/2014 | Holmes |
| 2016/0014368 A1 | 1/2016 | Holmes |

OTHER PUBLICATIONS

"Exchangeable image tile format for digital still cameras: Exif Version 2.2," Standard of Japan Electronics and Information Technology Industries Association, JEITA CP-3451, Apr. 2002, 15pgs.

"Digital Cameras D2X Set (body only)" product description photocopy from www.nikonusa.com web site, retrieved Jan. 2, 2007, (Applicant admits as prior art as of May 26, 2006), 5pgs.

* cited by examiner

FIG. 8
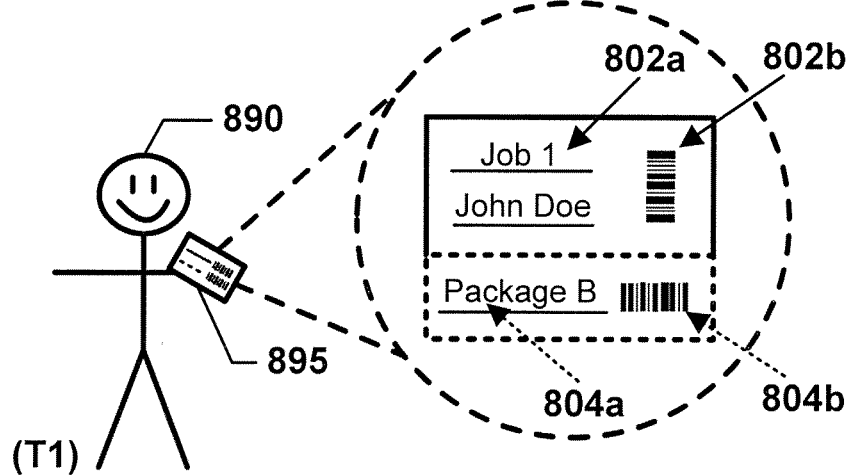
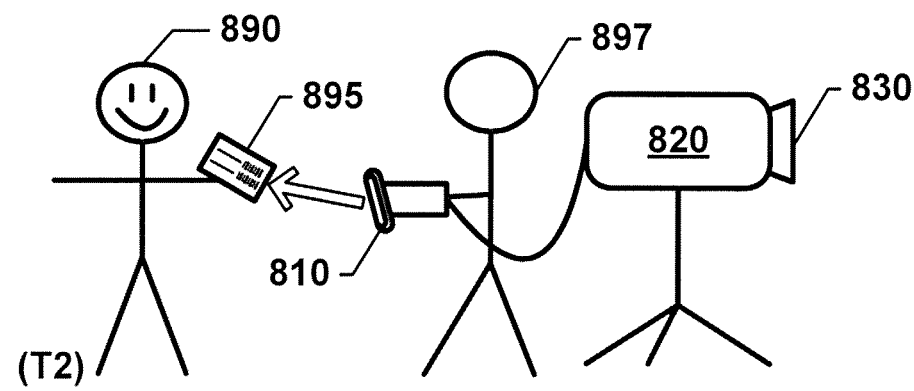
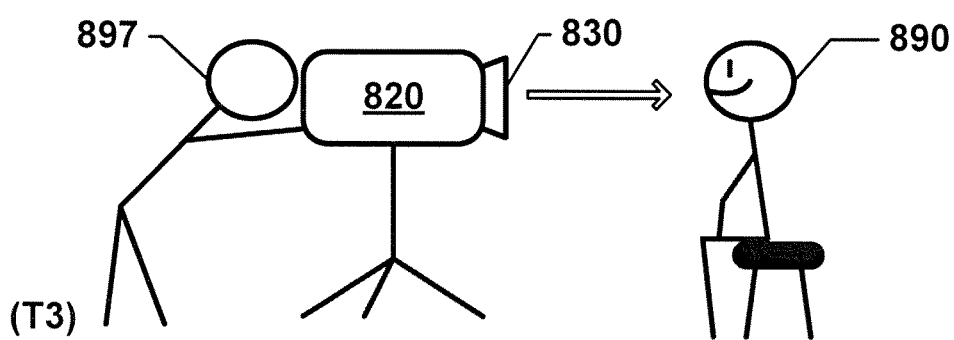

FIG. 11D

Latitude Field

| LAT_DEG_10 | LAT_DEG_1 | LAT_MIN_10 | LAT_MIN_1 | Decimal Point | LAT_MIN_TENTH | LAT_MIN_HUNDRETH |
|---|---|---|---|---|---|---|
| 1N (0→8) | 1N (0→9) | 1N (0→5) | 1N (0→9) | . | 1N (0→9) | 1N (0→9) |

Longitude Field

| LON_DEG_100 | LON_DEG_10 | LON_DEG_1 | LON_MIN_10 | LON_MIN_1 | Decimal Point | LON_MIN_TENTH | LON_MIN_HUNDRETH |
|---|---|---|---|---|---|---|---|
| 1N (0→8) | 1N (0→9) | 1N (0→5) | 1N (0→9) | 1N (0→9) | . | 1N (0→9) | 1N (0→9) |

UTC Time — 1100F

| UTCT_HR_10 | UTCT_HR_1 | UTCT_MN_10 | UTCT_MN_1 | UTCT_SE_10 | UTCT_SE_1 |
|---|---|---|---|---|---|
| 1N (1→2) | 1N (0→9) | 1N (0→5) | 1N (0→9) | 1N (0→5) | 1N (0→9) |

FIG. 11G

UTC Date — 1100G

| UTCT_DM_10 | UTCT_DM_1 | UTCT_MO_10 | UTCT_MO_1 | UTCT_YR_10 | UTCT_YR_1 |
|---|---|---|---|---|---|
| 1N (1→2) | 1N (0→9) | 1N (0→1) | 1N (1→9) | 1N (0→9) | 1N (0→9) |

IDENTIFYING AND TRACKING DIGITAL IMAGES WITH CUSTOMIZED METADATA

CROSS REFERENCE TO RELATED APPLICATIONS

This application is a continuation of U.S. patent application Ser. No. 14/611,545 filed on Feb. 2, 2015, entitled IDENTIFYING AND TRACKING DIGITAL IMAGES WITH CUSTOMIZED METADATA, which is a continuation of U.S. patent application Ser. No. 14/102,567 filed on Dec. 11, 2013, entitled IDENTIFYING AND TRACKING DIGITAL IMAGES WITH CUSTOMIZED METADATA, which is a continuation of U.S. patent application Ser. No. 12/729,898, filed on Mar. 23, 2010, issued as U.S. Pat. No. 8,619,157, entitled IDENTIFYING AND TRACKING DIGITAL IMAGES WITH CUSTOMIZED METADATA, which is a continuation of U.S. patent application Ser. No. 11/441,904, filed on May 26, 2006, issued as U.S. Pat. No. 7,714,908, entitled IDENTIFYING AND TRACKING DIGITAL IMAGES WITH CUSTOMIZED METADATA, the disclosures of which are hereby incorporated by reference in their entireties. To the extent appropriate, a claim of priority is made to each of the above disclosed applications.

FIELD OF THE INVENTION

This invention relates generally to the field of portrait photography and more particularly to a method and apparatus for facilitating the identification and tracking of photographic portraits.

BACKGROUND

Photographic studios, professional photographers, and others performing commercial portrait work (collectively referred to herein as "photographers") often need to identify and track large numbers of images through the workflow process from image capture to portrait delivery. In general, captured images are tracked by associating each image with organizational information indicating how the image should be processed, to whom the processed image should be delivered, and other descriptive information useful for later identification, selection, or sorting of captured images. Without such organizational information, each captured image would need to be individually reviewed, which could be time consuming when processing a large number of images. Moreover, such review of individual images by others not present when the images were captured can be an arduous and inaccurate process.

In some cases, the organizational information includes information identifying the customer or the subject of the image. For example, in the case of school portraits, identifying information can include the name, school, and grade of the subject of each photograph. In other embodiments, the organizational information also includes order information. For example, each individual who has a photographic portrait taken may want multiple copies of the portrait in one or more sizes using one or more finishing techniques. Photographic portraits may also include multiple individuals, each of whom may want a different number of copies of the photograph in different sizes.

In some prior systems, photographers create order packages to facilitate tracking order information. Each package has a set number of copies for a set number of sizes. For example, a first package may include two pictures having a dimension of five inches by seven inches and ten "wallet" pictures having a dimension of two inches by three inches. Another package may include one picture having a dimension of eight inches by ten inches and eight "wallet" pictures.

Tracking organizational information in some prior systems includes printing the organizational information directly onto a negative of each portrait. However, the association between the organizational information and the image must be otherwise tracked between taking the picture and printing the negative. These issues are the same regardless of whether the photographic medium utilized is physical (e.g., a printed negative) or digital (e.g., a digital picture file). For example, in some prior digital systems, computer applications can be used to add metadata to an image downloaded from a digital camera. However, the association between the digital picture and the identity information must be otherwise maintained before obtaining the picture with the computer application.

One example prior method of associating an image with identifying information at the time the image is taken includes sequential ordering. For example, a photographer can record a list of photographic sessions, the number of pictures taken during each session, and the customer associated with each session in the same order in which the sessions are conducted. In such a system, however, the pictures must be kept in the same order in which they are taken or the association between each picture and the identity information may be lost.

In other systems, limited types of information can be associated with a digital image at the time the image is taken. Digital cameras typically record some types of information about a picture, known as metadata, along with the picture. In general, however, such information includes information about the picture itself and does not identify a customer or the subject of the image. For example, a typical camera encodes information regarding the make and model of the camera, the camera settings, and whether a flash is used. Some digital cameras also include information regarding the date and time the picture is taken. Some other digital cameras include a "Global Positioning System" (GPS) unit to track and record the physical location, Coordinating Universal Time (UTC) date, and UTC time at which each picture is taken.

In still other systems, data can be associated with a digital image file on a digital camera through emulation of the memory card of the digital camera. US Publication No. 2005/0036034 discloses a system by which a processing unit emulates a memory card of a digital camera such that the digital camera's electronics operate with the memory of the processing unit through a camera interface card as if such memory was on a memory card located in the digital camera. Images captured by the digital camera are transferred, via the camera interface card, to the memory of the processing unit and the digital camera can access (e.g., read) images stored in the memory of the processing unit. Data can be associated with the image files by partitioning the memory of the processing unit to accommodate both originally captured images and copies of the images including file names and/or headers modified to indicate the data desired to be associated with the images.

Therefore, there is a need in the art for a tracking system that facilitates tracking of the association between an image and organizational information facilitating production and delivery of the image. Aspects of the present invention overcome these and other shortcomings of the prior art and address these needs in the art.

SUMMARY

The invention relates to a method and system for associating customized information with a digital image and, in particular, identifying and tracking digital images using customizable user metadata.

The invention enables a photographer to immediately associate customized information with an image at the time the image is taken. Customized information includes any information a photographer desires to associate with an image. Examples of customized information include information identifying a customer, information identifying an order package, and any internal tracking information of interest to the photographer. The invention thereby enables more accurate identification and tracking of such information with regard to each image.

Generally, the invention is implemented using a camera. The camera obtains and stores an image. When the image is being stored, the camera also stores customized information along with the image, thereby associating the customized information with the image. The association between the customized information and image is automatically maintained when the image is retrieved from the camera at a later time.

In some systems, the camera obtains the customized data from an input device. A photographer can enter the customized information into the input device and can transmit the entered information to the camera.

In other systems, the camera cannot read or process the customized data entered into the input device. In such systems, a processor device acts as an intermediary between the camera and the input device. The processor device resequences, reformats, or otherwise modifies the input information to be readable by the camera.

According to one embodiment, a method for obtaining and tracking digital images includes inputting data identifying a subject of an image into a camera, acquiring an image with the camera, and storing the image and the inputted data, as metadata, in an image file when the image is acquired.

According to another embodiment, a system for obtaining and tracking digital images includes a digital camera, an input device, and a data processor. The digital camera obtains digital images, and embeds metadata into digital image files encoding the digital images. The input device obtains information relating to a subject of a digital image. The obtained information has a format different from the data formats processable by the digital camera. The data processor receives the obtained information from the input device, converts the format of the obtained information to a format processable by the digital camera, and inputs the converted information into the digital camera as metadata.

In one example embodiment, the camera is configured to accept and process a GPS data string, the input device includes a barcode scanner, and the data processor includes a microcontroller.

In another example embodiment, the camera, the input device, and data processor are provided within a housing to form an integrated device.

While the invention will be described with respect to preferred embodiment configurations and with respect to particular devices used therein, it will be understood that the invention is not to be construed as limited in any manner by either such configuration or components described herein.

Variations of the invention will become apparent to those skilled in the art upon a more detailed description of the invention. The advantages and features that characterize the invention are pointed out with particularity in the claims annexed hereto and forming a part hereof. For a better understanding of the invention, however, reference should be had to the drawings which form a part hereof and to the accompanying descriptive matter, in which there is illustrated and described a preferred embodiment of the invention.

BRIEF DESCRIPTION OF THE DRAWINGS

In the drawings in which like elements are identified with the same designation numeral:

FIG. 8 illustrates three events occurring during the use of one embodiment of the present invention;

FIGS. 11A-11G depict example GPS fields and a valid input format for each example field according to one embodiment of the present invention;

DETAILED DESCRIPTION

The invention relates to methods and systems for identifying and tracking digital images using metadata. In particular, the invention relates to methods and systems for associating customizable metadata, such as organizational data aiding in image production, with a digital picture at the time the digital picture is taken and tracking the digital picture with the associated metadata.

Figure 1:
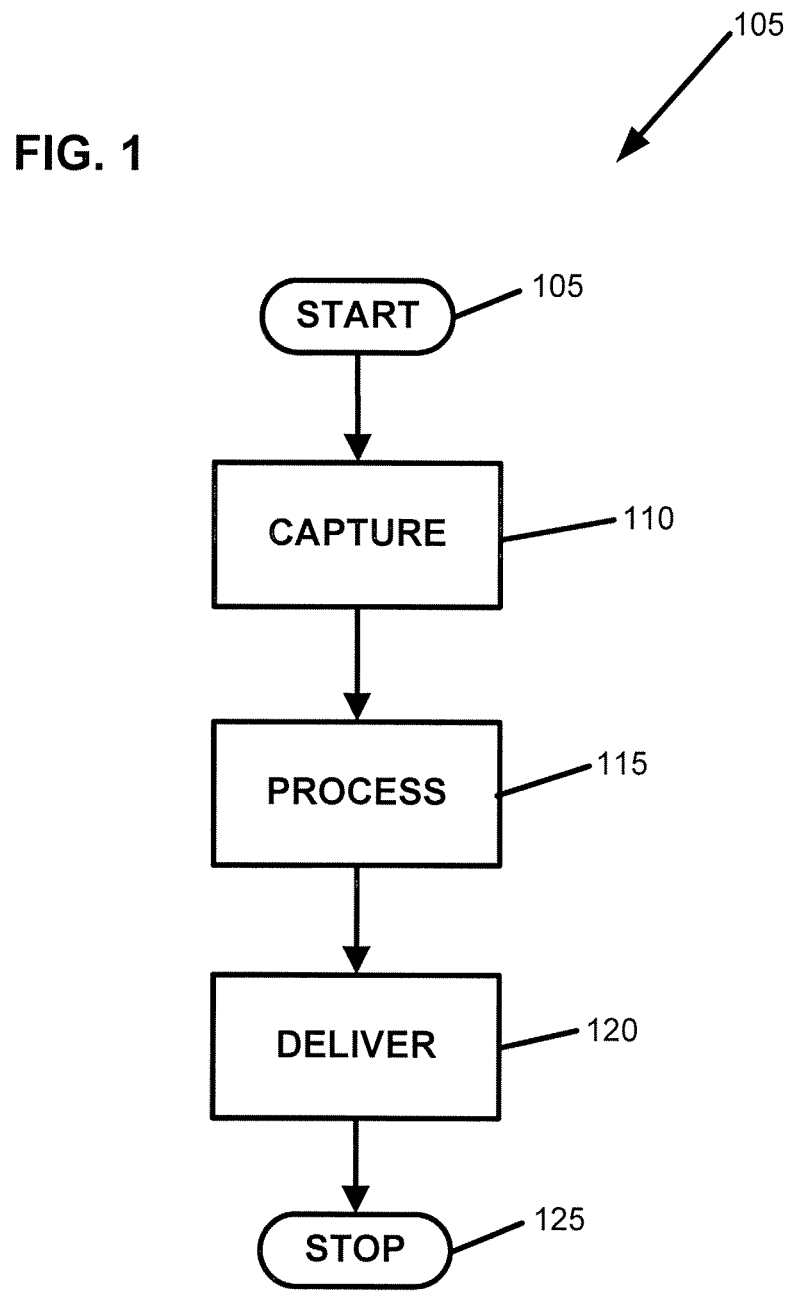
FIG. 1 illustrates an operation flow for an example process for providing photographic portraits to customers according to one embodiment of the present invention.

FIG. 1 illustrates an operation flow for an example process 100 for providing photographic portraits to customers. The process 100 begins at start module 105 and proceeds to a capture operation 110. The capture operation 110 obtains a photographic image of a subject. In some embodiments, the photographic image is obtained with a digital camera.

A process operation 115 produces one or more copies of the image. In some example embodiments, the process operation 115 renders the captured image according to order information provided by the customer. In other example embodiments, the process operation 115 edits the captured image before rendering the image. A deliver operation 120 sends the processed image to the customer. In some example embodiments, the deliver option 120 includes packaging and labeling the rendered image. The process 100 ends at stop module 125.

Figure 2:
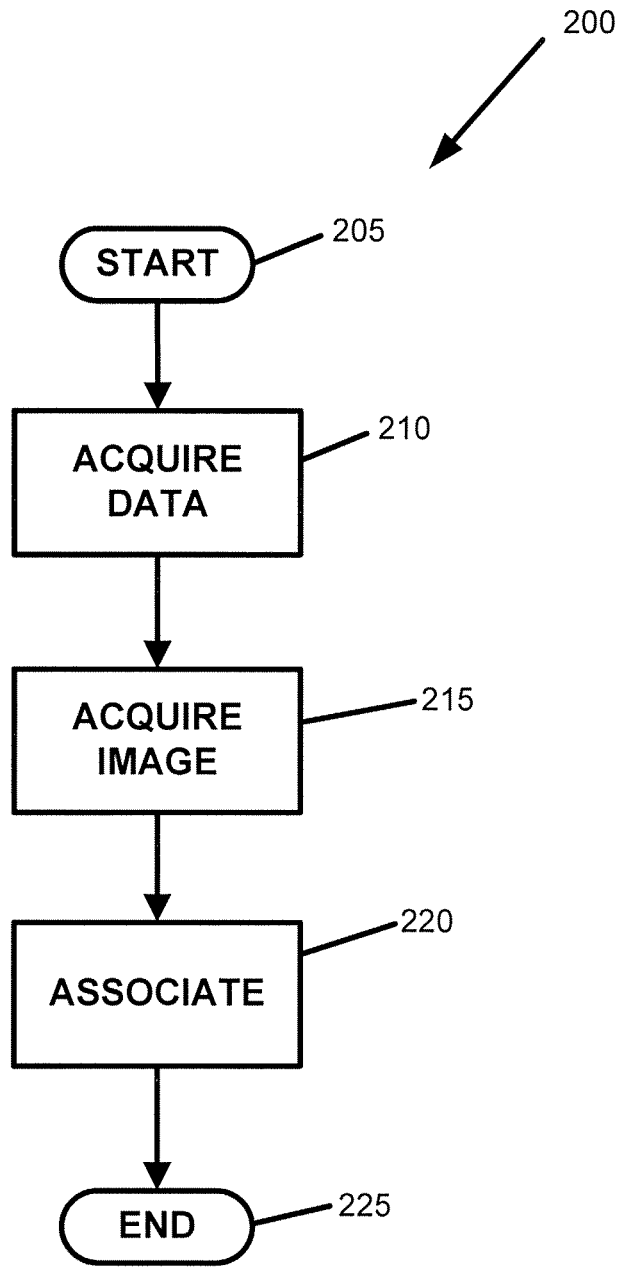
FIG. 2 illustrates an operation flow for an example process for aiding in processing images according to one embodiment of the present invention.

FIG. 2 illustrates an operation flow for an example process 200 for aiding in processing images. The process 200 begins at start module 205 and proceeds to a first acquire operation 210. The first acquire operation 210 obtains data pertaining to an image to be captured. In some embodiments, the obtained data includes organizational data aiding in the process operation 115 discussed in FIG. 1. Examples of organizational data include a job number, a reference number, and other tracking information. Details on acquiring the data are disclosed herein.

A second acquire operation 215 captures an image. In some embodiments, the second acquire operation 215 captures the image by taking a picture of a subject using a digital camera. An associate operation 220 creates an association between the captured image and the acquired data. In some embodiments, the associate operation 220 stores the data as metadata in the image file encoding the captured image. In one example embodiment, the associate operation 220 stores organizational data, such as a job number, with a captured image in an Exchange Image File Format (EXIF). The process 200 ends at stop module 225.

Figure 3:
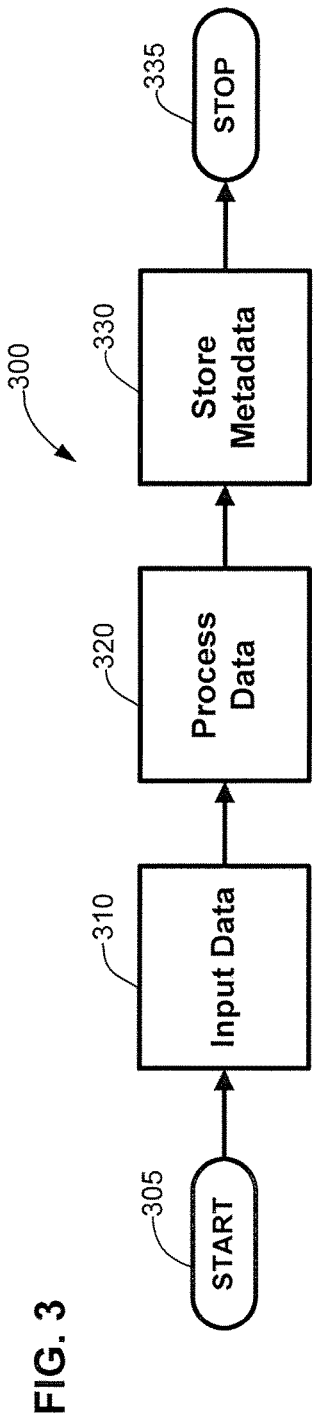
FIG. 3 illustrates an operation flow for a process for identifying and tracking digital images according to one embodiment of the present invention.

FIG. 3 illustrates an operation flow for a process 300 for identifying and tracking digital images. The process 300 begins at start module 305 and proceeds to input operation 310. Input operation 310 obtains from a user data to be associated with an image. Generally, the obtained data is formatted to be readable by an input device and not by a digital camera. In some example embodiments, the obtained data is formatted as barcode data. In other example embodiments, the obtained data is a sequence of numbers and/or letters. Of course, in still other embodiments, the obtained data can be in any format not readable by a camera.

A process operation 320 reformats (i.e., or otherwise converts) the obtained data into a format readable by a digital camera. Generally, the process operation 320 reformats the obtained data to resemble data the camera is configured to receive. In some embodiments, the obtained data is broken up (i.e., or fragmented) and rearranged into a new sequence. For example, in one embodiment, the process operation 320 converts the obtained data into a GPS data string.

A store operation 330 encodes the reformatted data as metadata in a digital picture file at the time the corresponding picture is obtained. The data to be associated with the digital picture is thereby stored in the digital image file. The process 300 ends at module 335.

Figure 4:
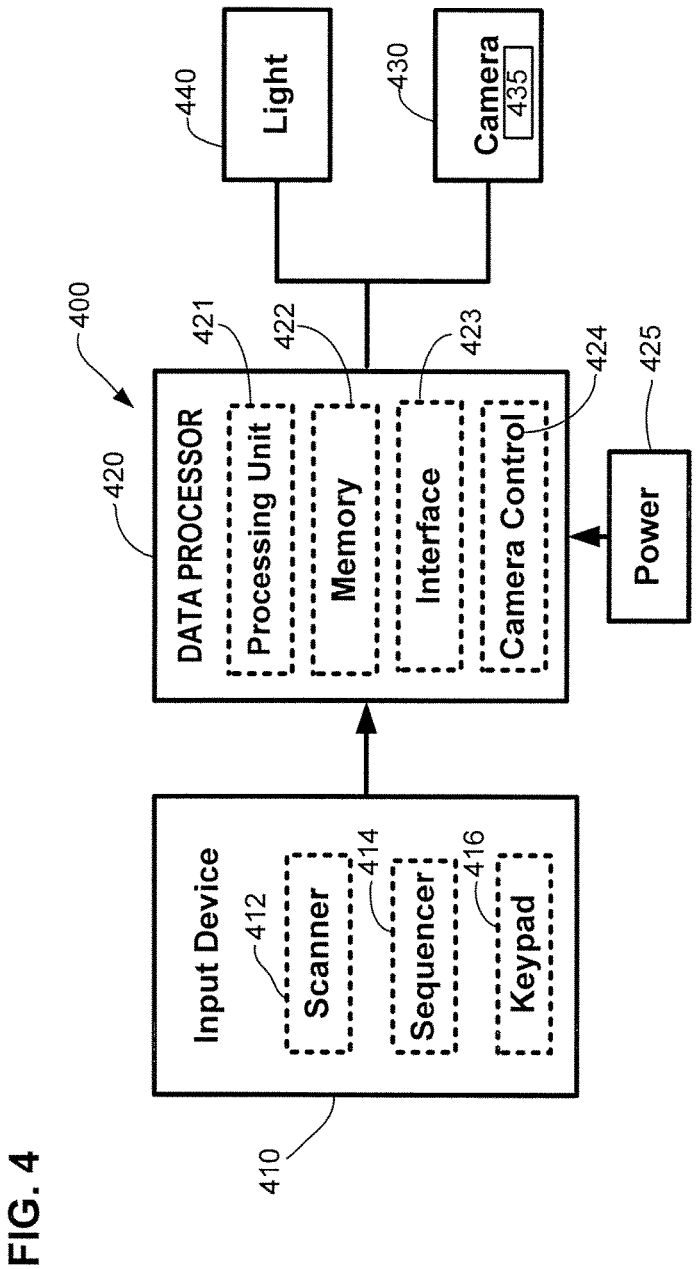
FIG. 4 illustrates a block diagram of a system for implementing the process shown in FIG. 3 according to one embodiment of the present invention.

FIG. 4 illustrates a block diagram of a system for implementing the process 300 shown in FIG. 3. Generally, the system 400 includes a data input device 410, a data processing device 420, and a digital camera 430. In some embodiments, the system 400 also includes one or more external lights 440 for illuminating a subject when a picture of the subject is taken. A power unit 425 is also typically electrically coupled to at least one of the above devices 410, 420, 430, 440.

The data input device 410 enables a user to enter data that the user desires to associate with a digital picture into the system 400. Examples of such user-entered data include information identifying the subject of the image, information regarding desired future applications of the image, and other data of interest to the user. For example, in one embodiment, the user-entered data includes the subject's name and an order package choice.

Examples of the data input device 410 include a scanner 412, a keypad 414, and a character sequencer 416. In other embodiments, however, any suitable input device can be used. In one embodiment, the scanner 414 is a barcode scanner and the data of interest to the user is formatted and printed as a barcode. In another embodiment, the data of interest is a sequence of numbers and/or letters that the user can manually enter using a keypad 414. In yet another embodiment, a character sequencer 416 generates a sequence of numbers and/or letters to be associated with the user.

The data processing device 420 coverts the data obtained by the input device 410 into a form of data readable by the camera 430. Generally, the data processing device 420 includes a processing unit 421 such as a microcontroller, a computer, or a logic simulator and memory storage 422. The data processing unit 420 is communicatively coupled to the data input device 410 and to the camera 430. In some embodiments, the data processing device 420 includes a communications interface 423 for communicating with at least one of the input device 410 or the camera 430. In other embodiments, the data processing device 420 includes a camera control unit 424 for operating the camera 430. The data processing device 420 will be described in greater detail herein.

The digital camera 430 obtains images (e.g., shoots pictures) and creates image storage files encoding the obtained images. The digital camera 430 is also configured to obtain and process certain types of metadata associated with the obtained image. In general, the digital camera 430 recognizes one or more metadata formats and stores metadata having a recognizable format in the image storage files along with the obtained images. For example, in some embodiments, the digital camera 430 includes a Global Positioning System (GPS) unit and is configured to receive and process a GPS data string as metadata. In general, a GPS data string includes one or more fields configured to contain GPS information.

In some example embodiments, one or more external lights 440 are operably coupled to the data processing unit 420 or to the digital camera 430. The lights 440 are synchronized with the camera 430 to illuminate the subject of the digital picture when the picture is taken.

Figure 5:
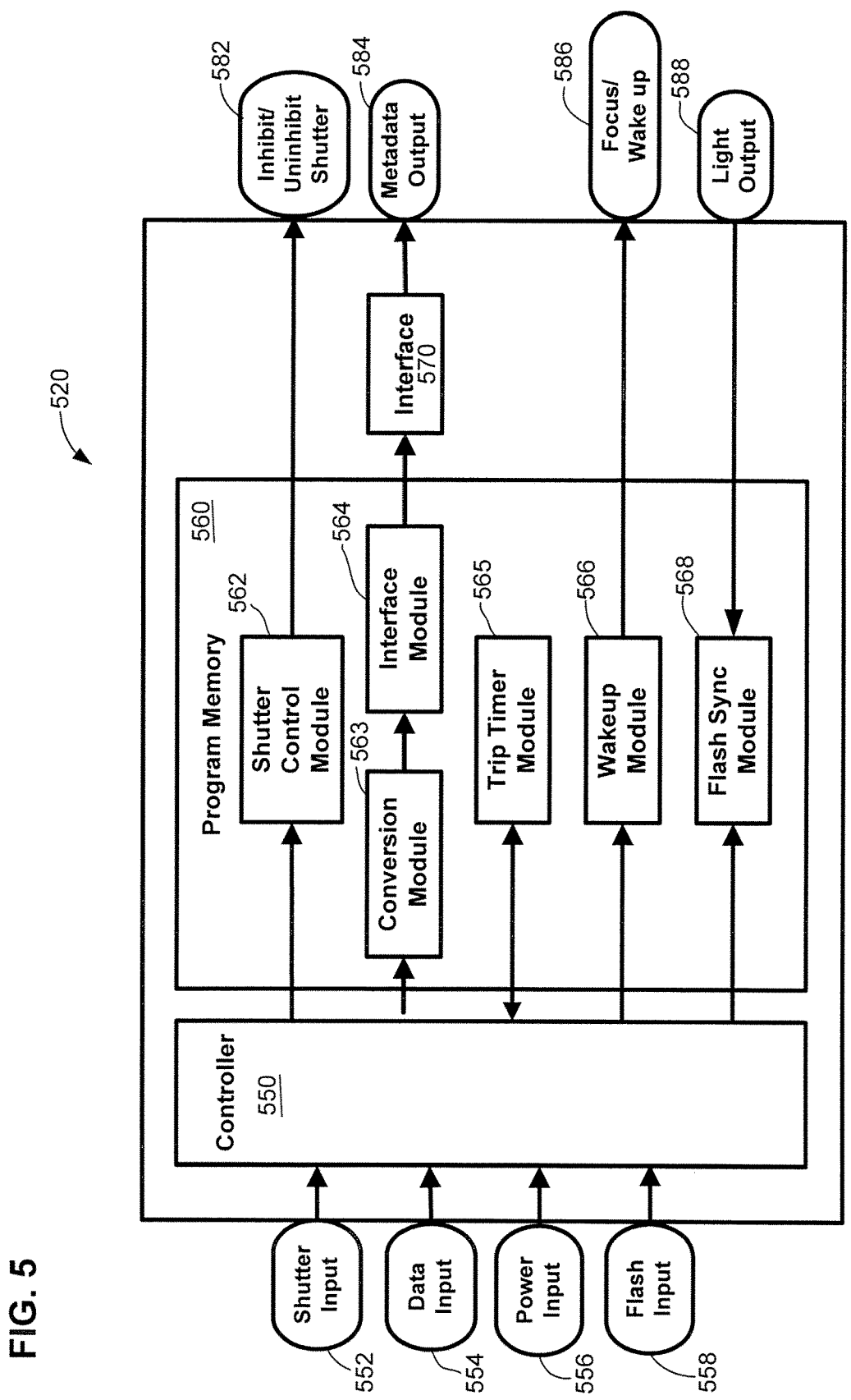
FIG. 5 illustrates one example of a data processing device including processing software according to one embodiment of the present invention.

FIG. 5 illustrates a block diagram of one example of a data processing device including processing software. The data processing device 520 includes a microcontroller 550 and program memory 560. In some embodiments, the data processing device 520 also includes an interface 570 for communicating between the processing device 520 and the camera, such as the camera 430 of FIG. 4.

The data processing device 520 also includes input ports and output ports for communicatively coupling to a data input device, a camera, and external lights. In some example embodiments, the input ports include a shutter synchronization input port 552, a data input port 554, and a flash input port 558. The shutter input port 552 couples to a shutter output of the digital camera. The shutter output indicates whether the camera's shutter was triggered (i.e., whether a picture was taken). The data input port 554 couples to a data input device, such as the scanner 412 of FIG. 4. The flash input port 558 couples to a flash synchronization output of the digital camera that indicates when the camera flash, and hence the external lighting, should illuminate. In one embodiment, the data processing device 520 couples to an external power device, such as power device 425 of FIG. 4, via power input port 556. In another embodiment, the data processing device 520 includes an internal power source (not shown) such as a battery.

In some example embodiments, the output ports include a shutter control port 582, a metadata output port 584, and a focus/wakeup output port 586 coupled to the digital camera. The shutter control port 582 enables the data processing device 520 to inhibit and uninhibit the operation of the shutter of the digital camera. The metadata output port 584 couples the data processing device 520 to a metadata input port of the digital camera. One example embodiment of a digital camera metadata input port includes a GPS input port configured to receive information indicating the geographic position of the camera from a GPS unit.

The focus/wakeup output port 586 couples the data processing device 520 to the settings input of a digital camera. In one example embodiment, the focus/wakeup output port 586 couples the data processing device to the auto focus feature of the digital camera. In other embodiments, the output ports also include a light output port 588 coupled to one or more external lights, such as light 440 of FIG. 4, for operating the lights. Of course, in still other embodiments, the external lights may be coupled directly to the flash synchronization output of the digital camera.

In some embodiments, the program memory 560 of the data processing device 520 stores at least one program executed by the controller 550. In other embodiments, some of the functions of the programs are hardwired into the controller 550.

Generally, the program memory 560 stores a shutter control module 562, a conversion module 563, a trip timer 565, and a wakeup module 566. The shutter control module 562 prevents and enables triggering of the camera shutter. A user cannot take a picture using the camera if the shutter control module is inhibiting operation of the shutter. The conversion module 563 reformats or converts the data entered by a user to a format readable by the digital camera. The trip timer 565 determines whether a particular sequence of events has occurred within a set time period. The wakeup module 566 has control over at least one setting or parameter of the camera. The wakeup module 566 prepares the camera to take a picture (i.e., "wakes up" the camera) by adjusting the setting. In one example embodiment, the wakeup module 566 adjusts the focus of the camera.

In some embodiments, the program memory 560 of the data processing device 520 also stores an interface driver 564 for operating the interface 570. The interface 570 enables the data processing device 520 to communicate with the digital camera. In other embodiments, the program memory 560 stores a flash synchronization module 568 configured to control when the camera flash and/or the external lights illuminate the subject of a picture.

Figure 6:
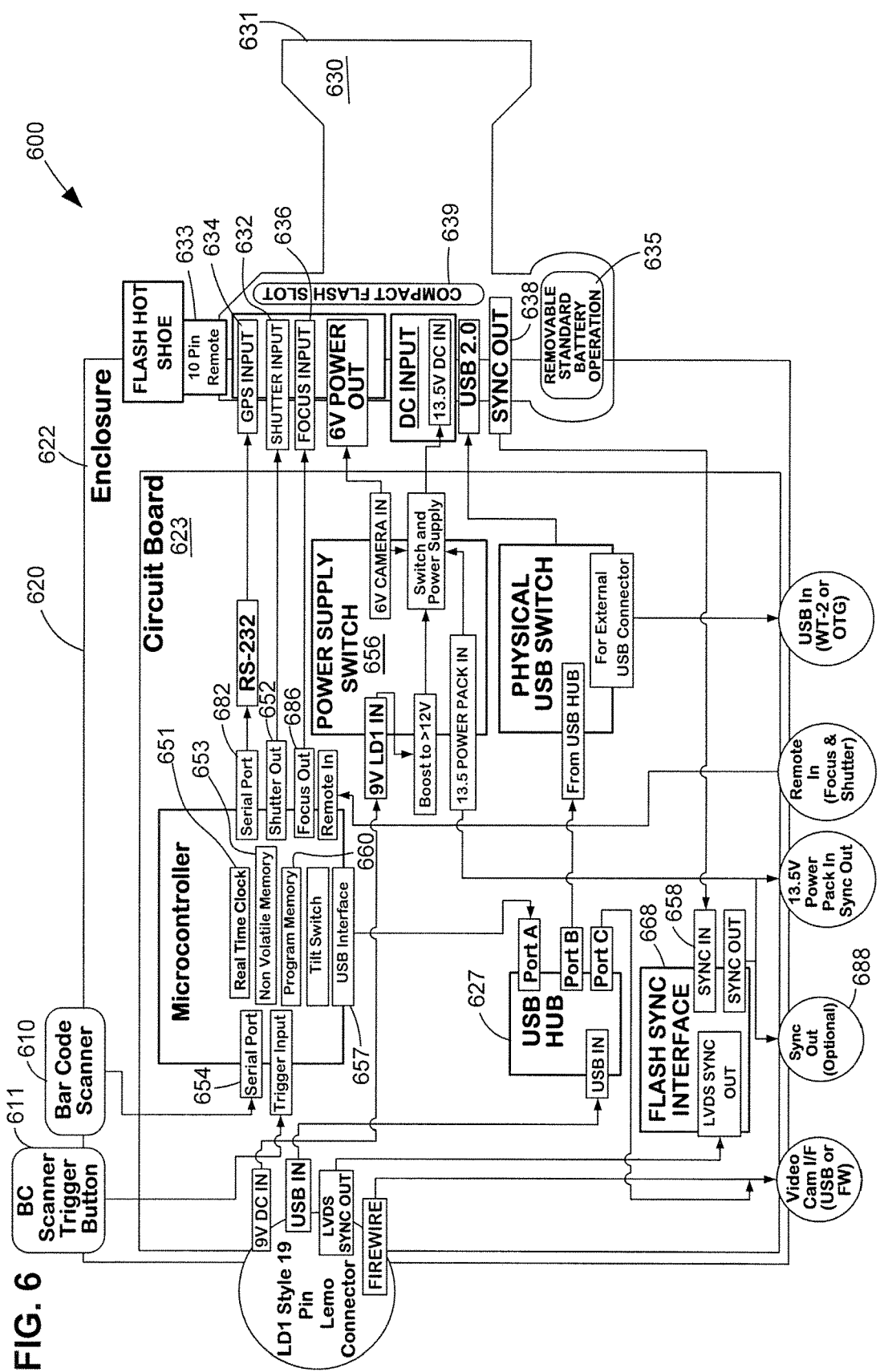
FIG. 6 illustrates one example embodiment of an integrated device configured according to the teaching of the present invention.

FIG. 6 illustrates one example embodiment of an integrated camera and data processing device configured according to the teaching of the present invention. The integrated device 600 includes an enclosure 622 housing a circuit board 623 and a camera 630. The circuit board 623 includes a microcontroller 650 having a clock 651, program memory 660, non-volatile memory 653, and at least one input/output port.

The microcontroller 650 is operatively coupled to an input device 610. In some embodiments, the input device 610 is housed within the enclosure 622. For example, in one embodiment, the enclosure 622 houses a barcode scanner 610. In other embodiments, the input device 610 is external of the enclosure 622 and couples to the controller through an input port on the enclosure 622.

In one embodiment, the microcontroller 650 couples to the input device 610 through a serial port 654. In another embodiment, the input device 610 couples to the microcontroller 650 through a USB port (not shown) and a USB hub, such as USB hub 627. The USB hub 627 couples to a USB interface 657 of the microcontroller 650 through another USB port. In other embodiments, however, any suitable data transfer means can be used. The microcontroller 650 converts the data received through the input device port 654 and transmits the converted data through an output port 682 to a metadata input port 634 of the camera 630.

In some embodiments, the input device 610 includes a trigger 611 that operates the input device 610. In one example embodiment, the trigger 611 is a button on the enclosure 622 that couples to a trigger input port on the microcontroller 650. In other embodiments, the input device 610 is external of the integrated device 600, and the trigger 611 operationally couples to the input device 610 and not to the microcontroller 650.

The microcontroller 650 is further coupled to the camera via shutter output port 652 on the microcontroller 650 and shutter input port 632 on the camera, enabling the microcontroller 650 to control the camera shutter. A focus output port 686 on the microcontroller 650 and a focus input port 636 on the camera 630 enable the microcontroller 650 to adjust the camera focus. Of course, in other embodiments, the microcontroller 650 may control other camera settings instead of the focus. In such a case, the appropriate ports would be used.

In some embodiments, the circuit board 623 also includes a flash synchronization interface 668. In one example embodiment, a signal indicating when the camera flash should illuminate is transmitted from an output port 638 on the camera 630 to an input port 658 on the flash interface 668. The signal is then transmitted via an output port 688 to external lights, such as external lights 440 of FIG. 4. In another example embodiment, however, the flash synchronization signal is transmitted from the camera output port 638 directly to the external lights.

In general, the integrated device 600 is configured to run on one or more power sources. For example, the circuit board 623 includes a power supply/switch 656 that is configured to receive input from an external 9 Volt DC source, an external 13.5 Volt power source, and/or a 6 Volt power source located in the camera 630. The power switch 656 is also configured to transmit power to a 13.5 Volt DC input port on the camera. In one embodiment, the camera 630 is also configured to use a removable battery 635.

The camera 630 includes a lens 631 and memory 639 in which to store digital pictures. In one example embodiment, the memory 639 includes a removable flash memory card. Of course, any suitable memory can be used. In some embodiments, the camera 630 includes an operation interface 633. In other embodiments, an external computer (not shown) controls the camera 630. In one example embodiment, the camera 630 is operatively coupled to the external computer with a cable connection. In another example embodiment, the camera 630 is operatively coupled to the external computer with a wireless connection.

Figure 7:
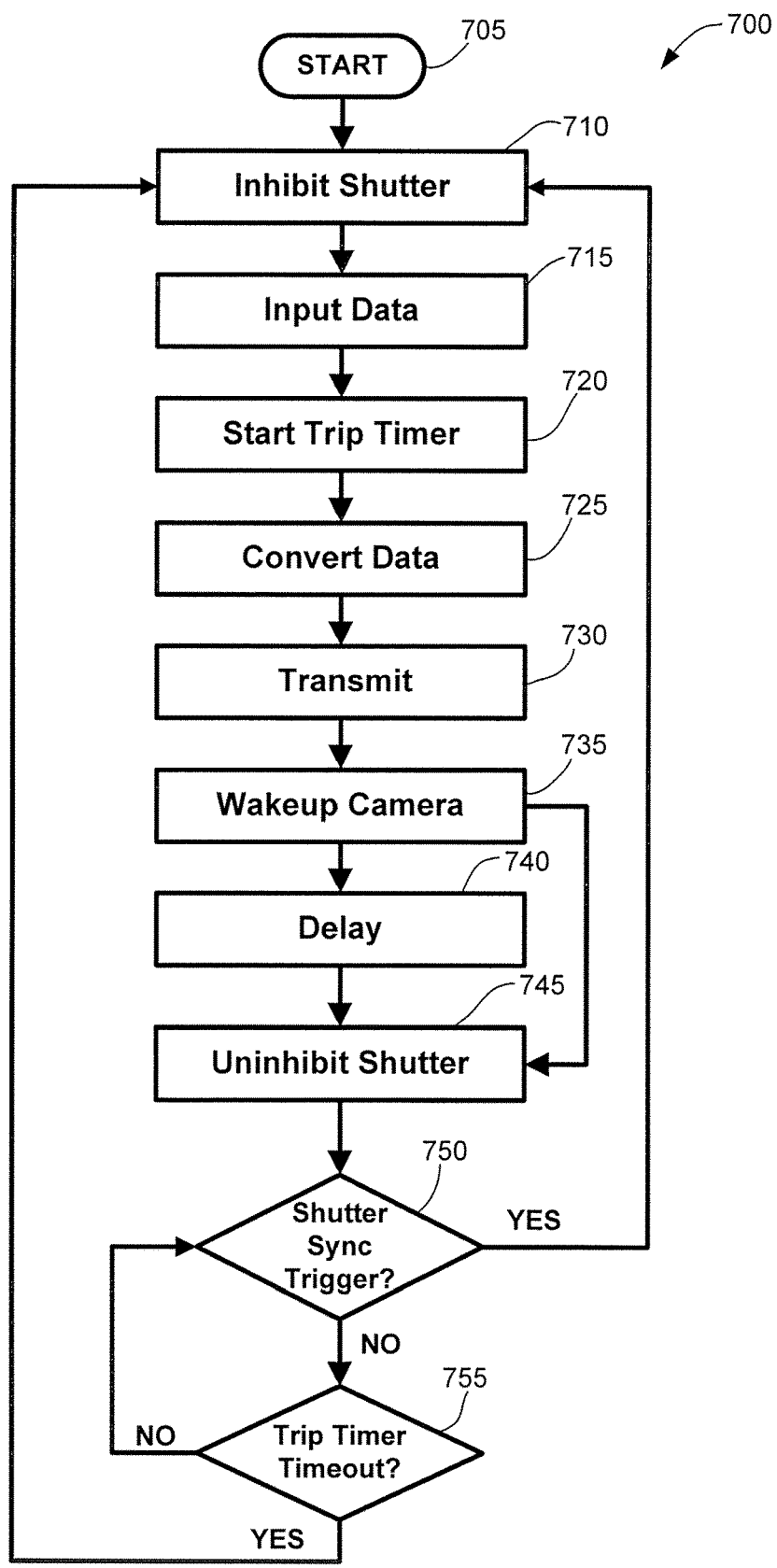
FIG. 7 illustrates an operation flow for a process for associating the processed user data with a digital picture according to one embodiment of the present invention.

FIG. 7 illustrates an operation flow for an example process 700 for associating the converted user data with a digital picture at the time the picture is taken. The process 700 begins at module 705 and proceeds to an inhibit operation 710. The inhibit operation 710 prevents the user from triggering the camera shutter, thereby preventing the user from taking a picture. Generally, the inhibit operation 710 prevents a user from taking a picture until after the user has entered data to be associated with the picture.

A receive data operation 715 receives user-entered data from a data input device, such as the data input device 410 of FIG. 4. In some embodiments, the receive data operation 715 receives a data string including a sequence of numbers and/or letters. In other embodiments, the receive data operation 715 receives two or more data strings. After the data is received, a start timer operation 720 activates a timer that counts down over a preset length of time.

A convert operation 725 reformats (i.e., or otherwise converts) the data received in operation 715 into a format recognizable to the digital camera. A transmit operation 730 sends the reformatted data to the digital camera. In some embodiments, the transmit operation 730 sends the reformatted data to the digital camera only once. In other embodiments, the transmit operation 730 repeatedly sends the reformatted data to the digital camera in a continuous stream.

A wakeup camera operation 735 adjusts at least one of the parameters of the digital camera in order to ensure that the camera is ready to receive the data and/or to take a picture. In some embodiments, the wakeup camera operation 735 changes the focus of the camera. In other embodiments, however, the wakeup camera operation 735 turns the camera flash on or off, changes the zoom setting, or adjusts another setting on the camera.

In some embodiments, an uninhibit operation 745 then releases the shutter trigger and enables the user to take a picture using the camera. In other embodiments, however, a delay operation 740 occurs after the wakeup operation 735, but before the uninhibit operation 745. The delay operation waits for a predetermined amount of time before proceeding to the uninhibit operation 745. Generally, the delay operation 740 has a sufficiently long duration to ensure that the camera has time to both wakeup and to receive the transmitted data.

After the uninhibit operation 745 has released the camera shutter, the process 700 monitors at module 750 whether or not the shutter has actually been triggered. If and when the shutter is triggered, indicating that a picture has been taken, the process 700 returns to the inhibit operation 710 to begin another cycle. The process 700 also monitors at module 755 the status of the timer that was activated by operation 720. When a predetermined length of time has passed without detecting operation of the camera shutter, the process 700 returns to the inhibit operation 710. Returning to the inhibit operation 710 prevents the user from taking a picture until a new set of data has once again been received and all steps of the process 700 have been repeated. This timeout feature helps to ensure that the entered data is associated with the correct picture.

Referring now to FIG. 8, one example embodiment of the present invention can be used to identify and track professional school pictures. FIG. 8 illustrates three events occurring during such an application. The three events occur at times T1, T2, and T3, respectively. At time T1, an individual 890 receives an identification card 895 (i.e., or another indicia-bearing instrument) indicating information by which the individual's school picture can be tracked. For example, in one example embodiment, the identification card 895 indicates a job number and the individual's name. In other embodiments, however, the identification card 895 can also indicate the individual's school, class, town, whether the individual is a student or a teacher, or any other information useful for identifying the individual 890.

In some embodiments, the identification card 895 also includes order information. For example, in the embodiment shown, the identification card 895 indicates at 804*a* that the individual 890 has ordered Package B. The order information is also encoded as a barcode at 804*b*. In other embodiments, however, an individual 890 indicates her order preference separately. In some example embodiments, the individual 890 indicates her order preference on an envelope enclosing money equal to the cost of the order. In other example embodiments, the individual 890 indicates her order preference orally to the photographer 897.

In some embodiments, information displayed on the identification card 895 is printed in a format readable to a photographer 897. In other example embodiments, the information is written in a format readable by the input device 810, but not readable to the photographer 897. In still other embodiments, the information is written in multiple formats. For example, in one embodiment, the identification card 895 displays the individual's name and order package choice in both a typeface format 802*a*, 804*a* and a barcode format 802*b*, 804*b*, respectively.

In general, subject portraits are not the only types of pictures taken by the photographer 897 during a session. As used herein, the term subject portrait refers to a picture of a subject such as an individual. Examples of other types of pictures are pictures taken to calibrate or monitor the performance of the camera. Still other examples include pictures taken to aid in tracking and identifying the pictures taken during a session. For example, in some embodiments, pictures are taken of start boards, calibration boards, room boards, end boards, and other such instruments. Start and end boards indicate the beginning and end, respectively, of a sequence of shots. A picture of a calibration board can be used to tailor the processes used to develop a picture. A dust shot can also be taken to determine the effectiveness of the camera over time.

In some embodiments, a photographer 897 can enter additional information, such as a control code, into the input device to indicate the type of picture being taken. In one example embodiment, the photographer 897 enters a control code separately. In other embodiments, however, the control code is included in the information displayed on the identification card 895 and entered when the displayed information is entered.

Still referring to FIG. 8, at time T2, the information on the identification card 895 is entered using an input device 810. In some embodiments, the input device 810 is coupled to a data processing device 820. In other embodiments, the input device 810 is coupled to an integrated camera and data processing device as described above with reference to FIG. 7. In one example embodiment, the input device 810 is a barcode scanner coupled to the data processing device 820.

In the example shown in FIG. 8, a subject barcode 802 and an order barcode 804 displayed on the identification card 895 are scanned using a barcode scanner 810 coupled to an integrated data processor 820 and camera 830. In other embodiments, however, the photographer 897 can scan a barcode corresponding to an individual's order preference from a listing of barcodes encoding possible order preferences, such as the different package choices.

One or more pictures are taken of the individual 890 at time T3 using the digital camera 830. The digital camera 830 saves the picture information in a storage file. The storage file also encodes as metadata the information entered at time T2. For example, in the embodiment shown in FIG. 8, the camera 830 stores the subject's name and order information in the image file. In some embodiments, the digital camera 830 is controlled directly by an operator 897. In other embodiments, the digital camera 830 is controlled by an external computer (not shown) operatively coupled to the digital camera 830.

Figure 9:
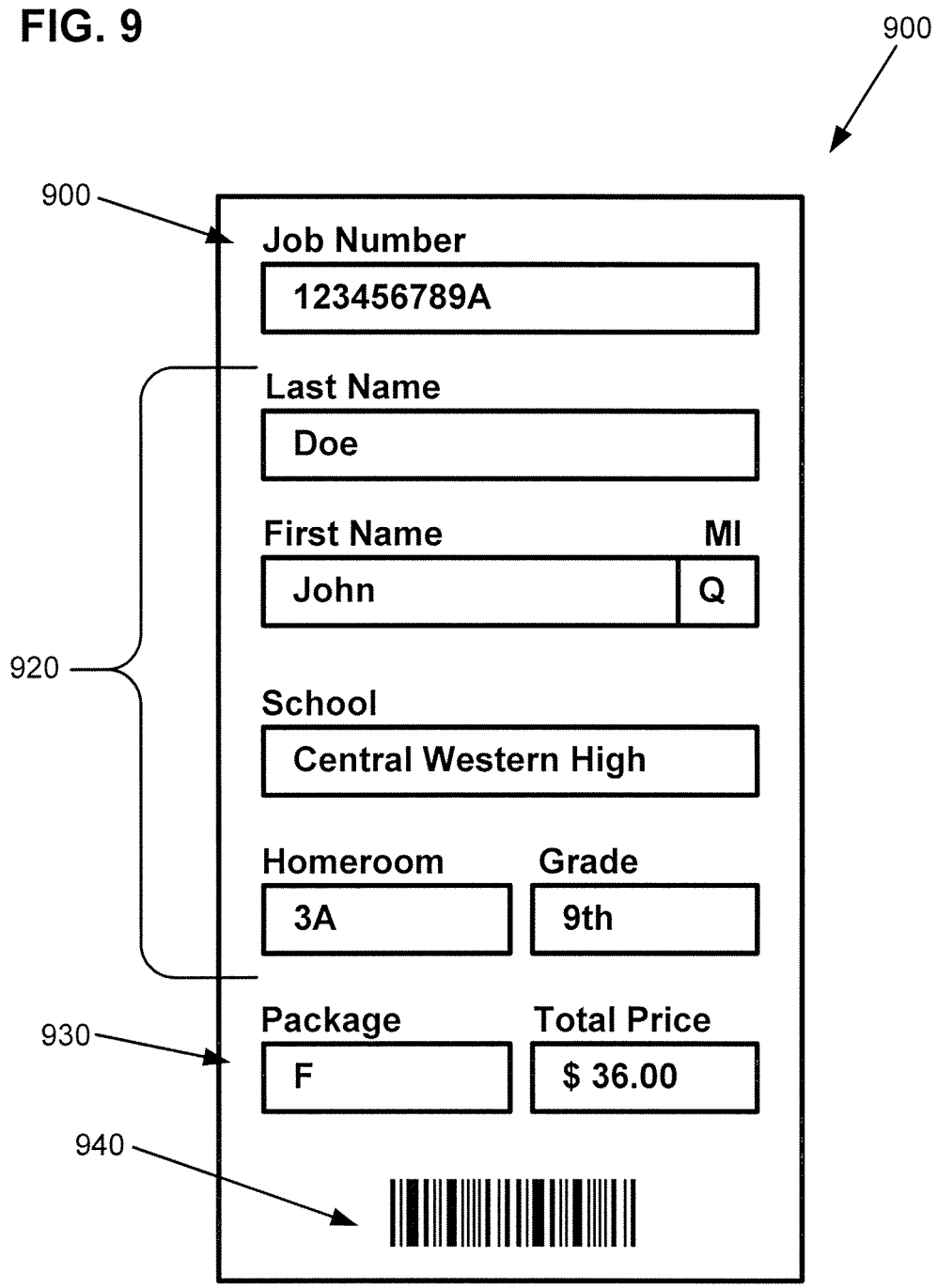
FIG. 9 illustrates an example identification card according to one embodiment of the present invention.

FIG. 9 depicts one example embodiment of an identification card 900 indicating a job number at 910, information identifying the individual 890 at 920, and order information at 930. In the example embodiment shown, the information identifying the individual 890 includes the name, school, homeroom, and grade of the individual 890. In other embodiments, however, the identification card 900 could provide other identifying information. In one example embodiment, the identification card 900 includes a barcode 940 encoding at least some of the information found on the identification card 900.

Figure 10:
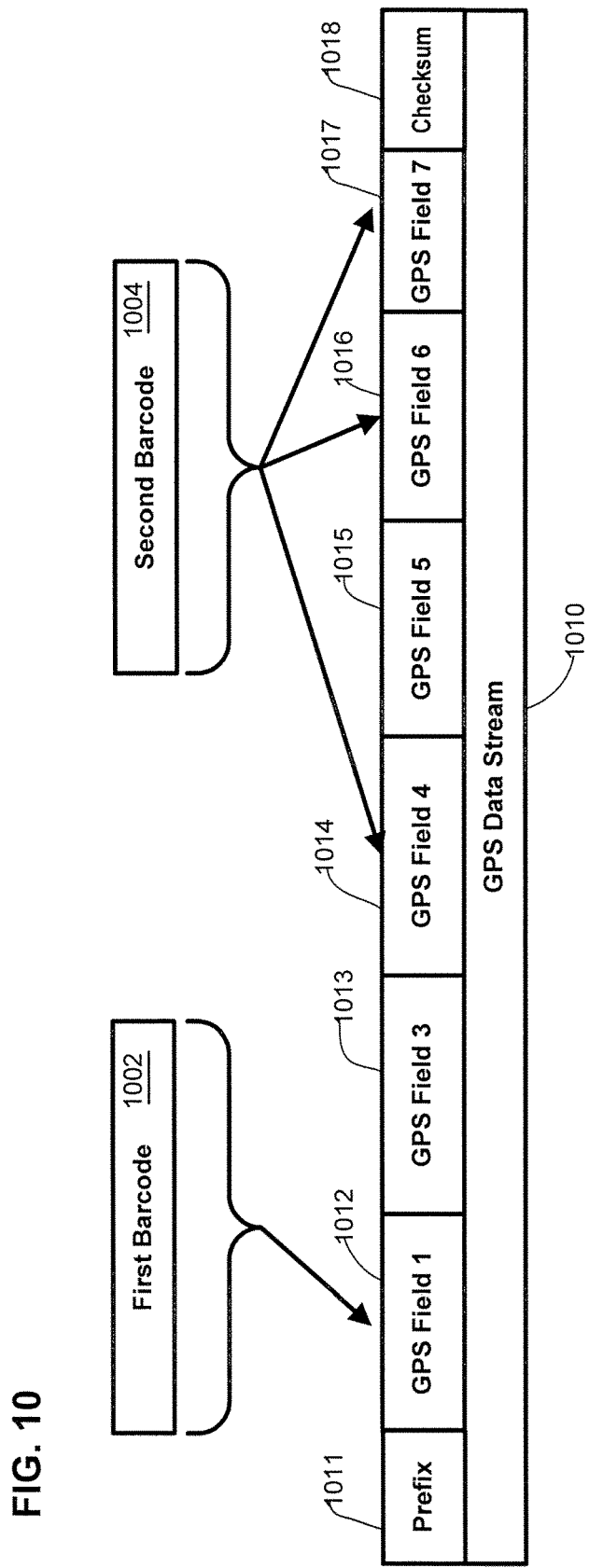
FIG. 10 illustrates a block diagram depicting loading user data into GPS fields of a GPS data stream.

Referring now to FIG. 10, in some embodiments, the step of converting user-customized data, such as the subject and order barcodes 802b, 804b of FIG. 8, includes loading the data into one or more GPS fields and assembling the GPS fields into a GPS data string. FIG. 10 illustrates a block diagram depicting loading user-customized data into GPS fields 1011-1018 of a GPS data stream 1010. In the example shown, the conversion process reformats two strings of data—a first barcode 1002 and a second barcode 1004. Of course, in other embodiments, the conversion process can convert any desired amount of data limited only by the capacity of the digital camera for accepting the data.

As shown in FIG. 10, in some embodiments, the conversion process fragments and/or resequences the user-entered data. For example, while the conversion process loads all of the first barcode 1002 into a second GPS field 1011, the conversion process breaks up the second barcode 1004 and loads only a portion of the second barcode 1004 into each of the fourth, sixth, and seventh GPS fields 714, 716, 717, respectively.

In some embodiments, the user-entered data is loaded into all fields 711-718 of the GPS data string 1010. In other embodiments, the user-entered data is loaded into only some of the GPS fields. The remaining GPS fields are set to default values. In some embodiment, the GPS data string 1010 includes a prefix field 1011 and a checksum field 1018. In some example embodiments, the checksum field 1018 enables verification that the GPS data string 1010 was transferred correctly from the processing device to the digital camera. In one example embodiment, the checksum field 1018 encodes a number calculated by the processing device based on at least some of the other fields in the GPS data string 1010. The data string 1010 is then passed to the digital camera.

The digital camera repeats the calculation and compares the result to the value encoded in the checksum field 1018 to verify that the data string 1010 has not been corrupted. If the value calculated by the digital camera matches the checksum value encoded in field 1018, then the camera captures an image and associates the data encoded in the data string 1010 with the captured image. In some embodiments, if the calculated checksum does not match the encoded checksum, however, a warning is issued to the photographer. In one example embodiment, a light on the camera flashes in warning. In other embodiments, if the value calculated by the digital camera does not match the checksum value, then the digital camera inhibits the image capture ability of the camera.

Figure 11A:
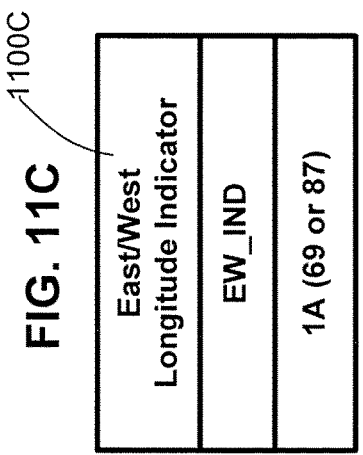
Figure 11C:
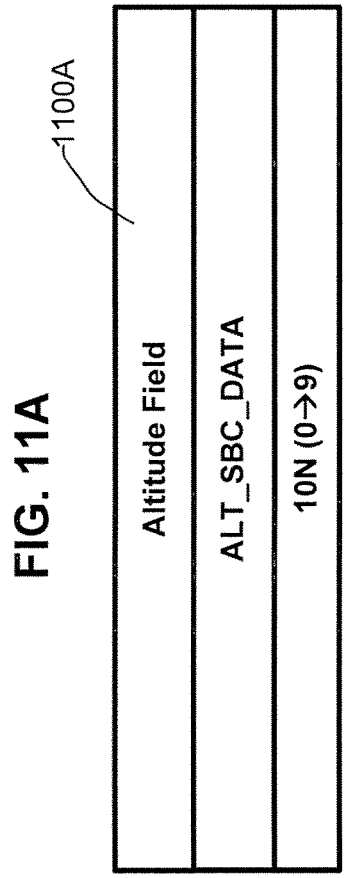
Figure 11B:
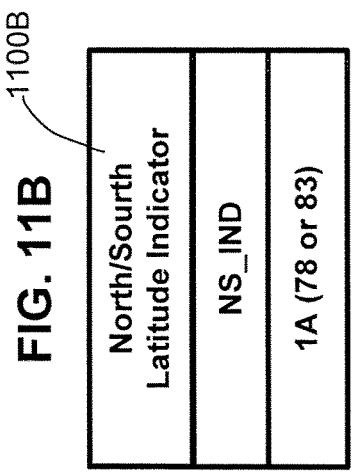

Referring now to FIGS. 11A-11G, each GPS field is configured to accept a valid input format. Data having a different format will not be accepted into the field. For example, FIG. 11A illustrates a GPS Altitude field 1100A configured to hold a rational number. FIG. 11B illustrates a North/South Latitude Indicator (NSLI) field 1100B configured to hold an ASCII decimal representation of the letter "N" or the letter "S" (i.e., 78 or 83, respectively). FIG. 11C illustrates an East/West Longitude Indicator (EWLI) field 1100C configured to contain an ASCII decimal representation of the letter "E" or the letter "W" (i.e., 69 or 87, respectively). In other embodiments, the NSLI and EWLI fields 1100B, 1100C are configured to accept the appropriate letters.

FIG. 11D illustrates an example Latitude field 1100D configured to contain three rational numbers. Generally, the three rational numbers indicate the latitude in degrees, minutes, and seconds, respectively. In some embodiments, because degrees latitude are typically indicated using the notation 0 to 90° North and 0 to 90° South, the first rational number is two integers long indicating the tenth's place and the one's place of the degree value. Minutes and seconds latitude are also typically expressed as two integers. In one example embodiment, because the Latitude field 1100D expects the second rational number to represent minutes, the first integer of the second rational number must range from 0 to 5 only to be accepted.

FIG. 11E illustrates an example Longitude field 1100E also configured to contain three rational numbers. Generally, the three rational numbers indicate the longitude in degrees, minutes, and seconds, respectively. In some embodiments, because degrees longitude are typically indicated using the notation 0 to 180° East and 0 to 180° West, the first rational number is three integers long indicating the hundredth's place, the tenth's place, and the one's place of the degree value. Minutes and seconds longitude are typically expressed as two integers. In one example embodiment, because the Longitude field 1100E expects the second rational number to represent minutes, the first integer of the second rational number must range from 0 to 5 only to be considered valid.

FIG. 11F illustrates an example Universal Time field 1100F configured to contain three rational numbers. Generally, the three rational numbers indicate the universal time in hours, minutes, and seconds, respectively. In some embodiments, hours, minutes, and seconds latitude are each expressed as two integers. In one example embodiment, because the Universal Time field 1100F expects the first rational number to represent hours, the first integer of the first rational number must equal either 1 or 2 to be accepted as valid. Similarly, in some embodiments, the first integer of the second and third rational numbers, which indicate minutes and seconds, respectively, must range from 0 to 5 only to be accepted.

FIG. 11G illustrates an example Universal Date field 1100G, which can be configured to hold a number of different formats. For example, in some embodiments, the field is configured to hold eleven ASCII characters in the format YYYY:MM:DD_with "_" indicating a null character. In other example embodiments, the field is configured to hold six ASCII characters in the format DDMMYY. In some embodiments, ASCII characters are expressed as a two integer decimal value. In still other embodiments, the date need not be read as an ASCII value. In the example shown, the Universal Date field 1100G is configured to hold six integers indicating a numerical date in the format DDM-MYY.

Figure 12:
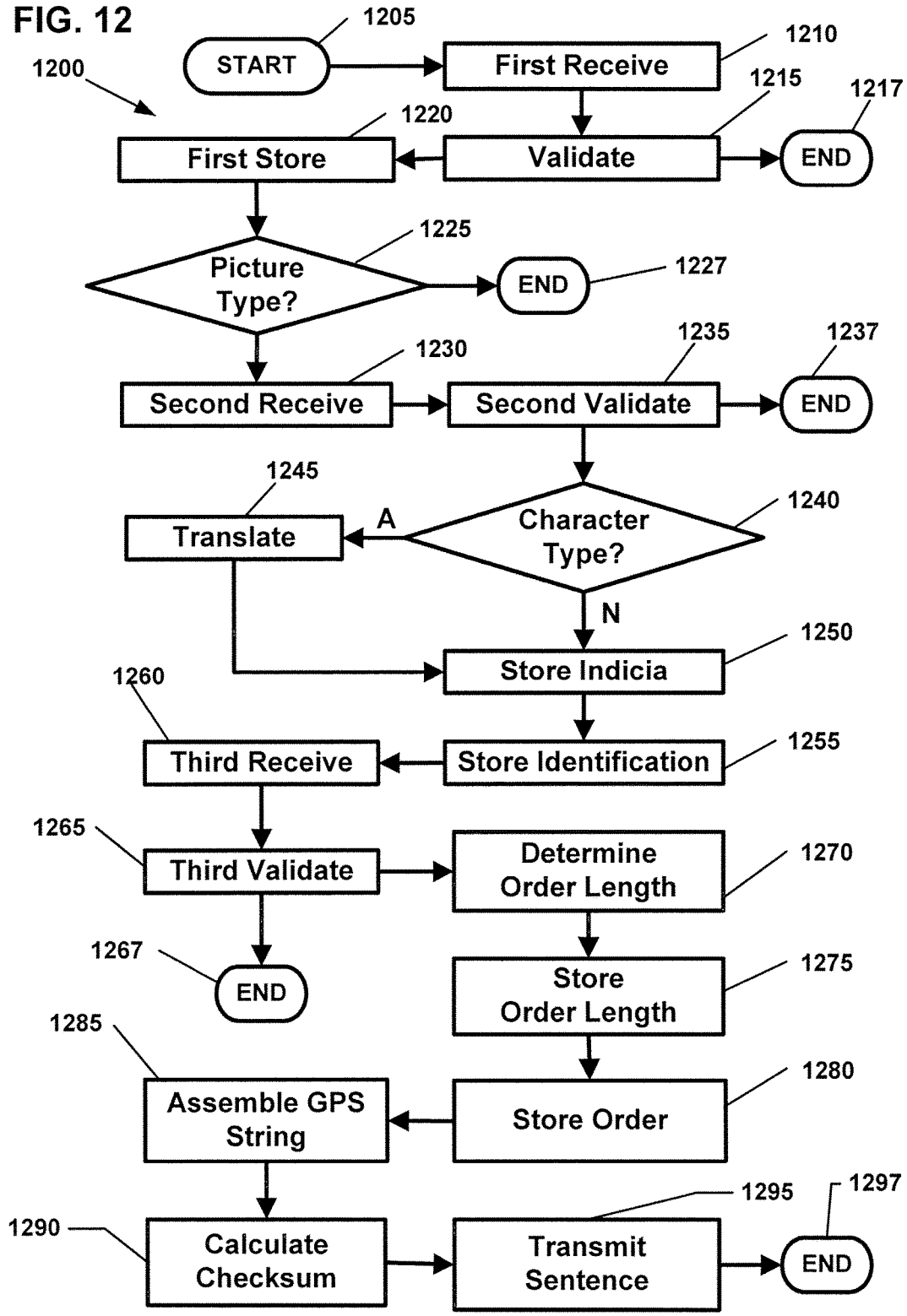
FIG. 12 illustrates an example operation flow for a process for converting user-customized information to information processable by a digital camera.

FIG. 12 illustrates an operation flow of an example process for converting user-entered information to information processable by a digital camera. In particular, FIG. 12 illustrates one example conversion process 1200 for loading up to three inputted data strings into the fields of a GPS data string. The example process 1200 is designed to load data associated with taking school portraits, such as a control code, a subject identifier, and an order identifier. Of course, in other embodiments, the process 1200 can be used to convert any user-entered data to a format readable by a digital camera.

The process 1200 begins at module 1205 and proceeds to a first receive operation 1210 that receives a first data string. In one example embodiment, the first data string is a control code indicating the type of picture being taken. A first validate operation 1215 determines whether the first data string is readable. In some embodiments, the first validate operation 1215 may also determine whether the first data string is correctly formatted. For example, the first validate operation 1215 may require that the first data string begin with a particular character, for example a "$." If the first validate operation 1215 determines that the received information is unreadable and/or incorrectly formatted, then the process 1200 ends at module 1217.

If the first validate operation 1215 determines that the received information is readable and/or correctly formatted, however, then a first store operation 1220 loads the first data string into a predetermined position in a predetermined GPS field. For example, the first store operation 1220 may load the first data string into the LAT_DEG_10 position of the Latitude field 1100D of a GPS string. In some embodiments, all of the received data is loaded into the GPS field. In other embodiments, only a portion of the received data is loaded into the GPS field. For example, in one embodiment, the validate operation 1215 requires that all control barcodes begin a "$" and only the characters following the "$" are loaded into the GPS field by the first store operation 1220. In still other embodiments, the first data string is loaded into multiple GPS fields.

The process 1200 next proceeds to a picture type determination module 1225, which determines the type of picture being taken based on the first received data string. For example, in one embodiment, a first data string of "1" indicates that the picture is a portrait and a first data string of "3" indicates that the picture shows a calibration board. If the picture being taken is not a portrait, then the process 900 ends at module 1227. Identification information and order information are generally not entered in such a scenario. If the picture being taken is a student portrait, however, or if a user desires to enter further information, then the process 900 proceeds to a second receive operation 1230.

The second receive operation 1230 receives a second data string, for example, a subject code identifying the subject of the portrait. A second validate operation 1235 determines whether the second data string is readable. In some embodiments, the second validate operation 1235 may also determine whether the second data string is correctly formatted. If the second validate operation 1235 determines that the second data string is unreadable or incorrectly formatted, then process 1200 ends at module 1237 with an error message. If the second validate operation 1235 determines that the second data string is readable and correctly formatted, however, then a character type determination module 1240 determines whether the second data string includes alphanumeric characters or numeric characters only.

If the module 1240 determines that the second data string includes only numeric characters, then the process 1200 proceeds directly to a store indicia operation 1250. The store indicia operation 1250 loads a predetermined value in a predetermined position in a predetermined GPS field. The predetermined value is configured to indicate that the second data string is numeric only. A store identity operation 1255 next loads the subsequent characters of the second data string into predetermined positions in at least one predetermined field. For example, in one embodiment, the store indicia operation 1250 loads the predetermined value into the first position of the Altitude field 1100A and the store identity operation 1255 loads the subsequent characters of the second data string into the subsequent positions of the Altitude field 1100A. In other embodiments, however, other GPS fields may be used to store the information.

Referring back to the determination module 1240, if the determination module 1240 determines that the second data string includes both numbers and letters, however, then the process 1200 proceeds to a translate operation 1245. The translate operation 1245 converts each of the characters found in the second data string to a numerical equivalent of the character. For example, each letter and number has a decimal ASCII value that can be expressed with two integers. In such a case, the store indicia operation 1250 loads a different predetermined value in the predetermined position of the predetermined field. The value would indicate that the second data string contains alphanumeric characters. The store identification operation 1255 would then load the translated numerical equivalents of the characters from the second data string into the appropriate positions in the appropriate field.

Next, a third receive operation 1260 receives a third data string, for example, an order code representing order information. A third validate operation 1265 determines whether the third data string is readable. In some embodiments, the third validate operation 1265 also determines whether the third data string is correctly formatted. For example, the third validate operation 1265 may require that the third data string begin with a particular character, for example a "–" sign. If the third validate operation 1265 determines that the third data string is unreadable and/or incorrectly formatted, then the process 1200 ends at module 1267 with an error message. If the third validate operation 1265 determines that the third data string is readable and formatted correctly, however, then the process 1200 proceeds to a determine order length operation 1270.

The order length operation 1270 determines the number of characters included in the third data string. A store order length operation 1275 loads the length of the third data string into one or more predetermined positions in one or more predetermined fields. For example, in some embodiments, the order length is indicated by a first integer representing the ten's column value of the length and a second integer representing the one's column value of the length. In one embodiment, the first and second integers are stored in the HR_10 and HR_1 positions, respectively, of the UTC Time field 1100F.

A store order operation 1280 loads each character of the third data string into a predetermined position of a predetermined GPS field. The characters need not be loaded in consecutive order within a field, however. For example, in one embodiment, the store order operation 1280 loads the first character of the third data string into the LAT_DEG_1 position of the Latitude field 1100D of the GPS string and the second character into the LAT_MIN_1 position of the Latitude field 1100D. The characters of the third data string need not even be loaded into consecutive fields. For example, continuing with the example discussed above, the store order operation 1280 loads the third character of the third data string into the MN_1 position of the UTC Time field 1100F. Of course, in other embodiments, any of the three data string can be stored in non-consecutive positions and/or fields.

An assemble operation 1285 sets any unloaded position in each field to a default value and forms a data string using the fields. A calculate operation 1290 determines a checksum value based on at least some of the other values stored in the GPS fields. The checksum value is encoded into a checksum field in the GPS data string, such as checksum field 1018 in GPS string 1010. A transmit operation 1295 passes the assembled GPS data string 1010 including the checksum value to a digital camera. The process 1200 ends at module 1297.

Figure 13A:
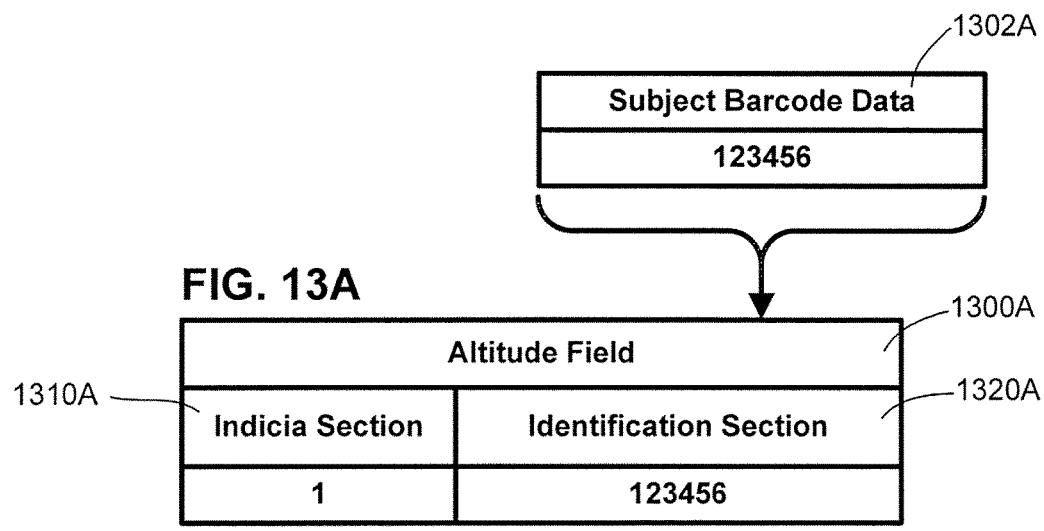
FIGS. 13A-13C illustrate example GPS fields resulting from some applications of the conversion process.
Figure 13B:
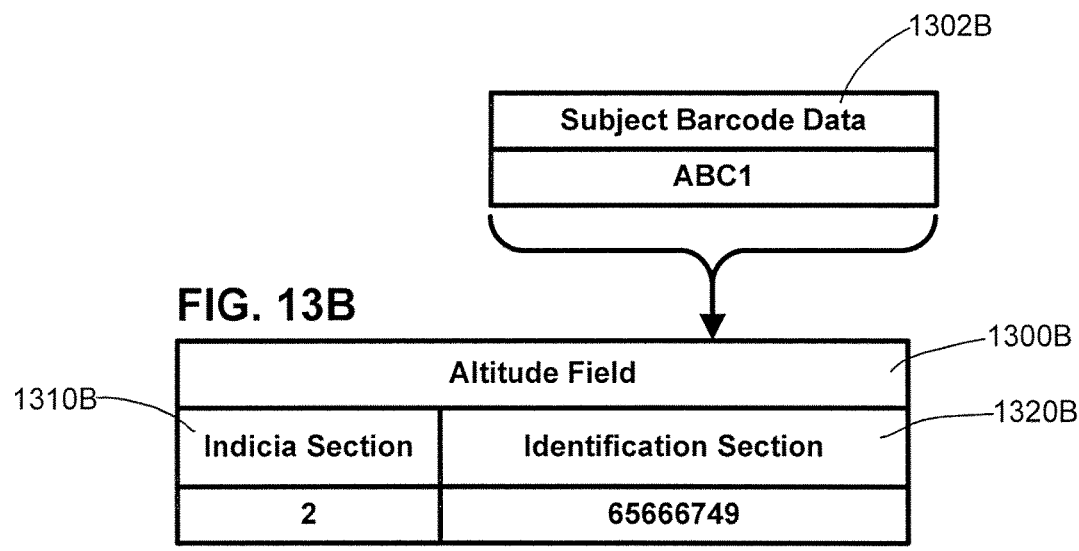
Figure 13C:
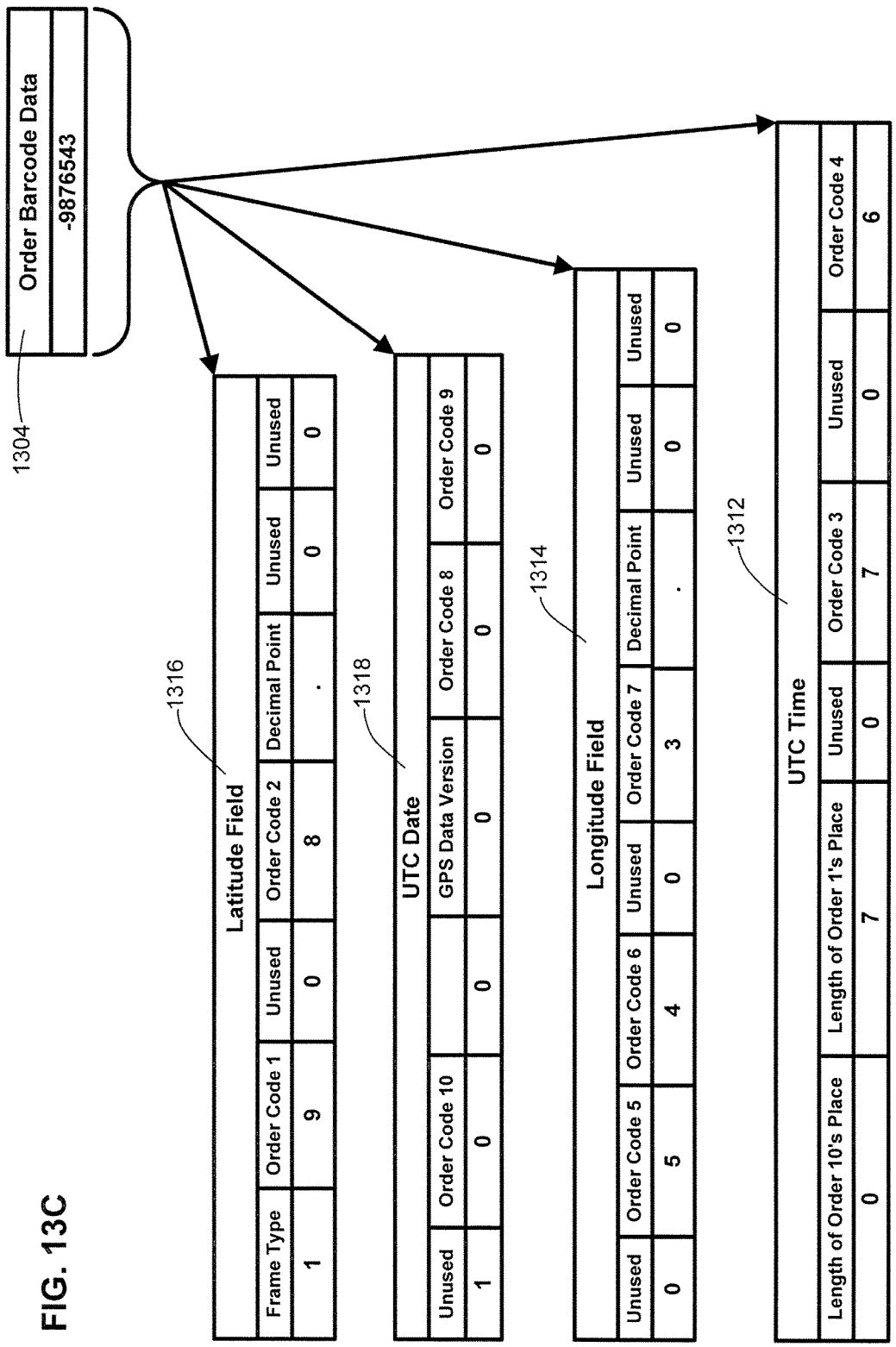

Referring now to FIGS. 13A-13C, some of the steps of the process 1200 can best be understood by some example applications. For the purposes of these examples, it is assumed that the picture to be taken is a student portrait.

FIG. 13A illustrates an example GPS Altitude field 1300A and a subject barcode 1002A. In the illustrated example, the subject barcode 1302A encodes the character string "123456." The second receive operation 1230 receives the character string and the second validate operation 1235 determines that the string is readable. The determination module 1240 then determines that the characters in the second data string are numbers only and, as shown in FIG. 13A, the store indicia operation 1250 stores the character "1" in the first position 1310A of the Altitude field 1300A. In the illustrated example, the character "1" indicates that the remaining characters stored in the Altitude field are numbers only. The store identification operation 955 loads the characters into the remaining positions 1320A of the Altitude field 1300A. As shown in the illustrated example, the remaining characters stored in the Altitude field are "123456." The Altitude field 1300A, therefore, contains the number "1123456".

FIG. 13B illustrates an alternative example of a GPS Altitude field 1300B being loaded with a subject barcode 1302B. In the illustrated example, the subject barcode 1302B encodes the character string "ABC1." In this example, the second receive operation 1230 of the process 1200 receives the character string and the second validate operation 1235 determines that the string is readable, similar to the example of FIG. 13A. The determination module 1240, however, determines that the characters in the second data string include both letters and numbers. The translate operation 1245 converts each of the letters and numbers into a decimal ASCII equivalent. For example, the number "65" is the decimal ASCII equivalent of the letter "A" and the number "49" is the decimal ASCII equivalent of the number "1."

As shown in FIG. 13B, the store indicia operation 1250 loads the character "2" in the first position 1310B of the Altitude field 1300B. In the illustrated example, the character "2" in this predetermined position indicates that the remaining characters stored in the Altitude field are decimal ASCII equivalents of letters and numbers. The store identification operation 1255 loads the translated characters into the remaining positions 1320B of the Altitude field 1300B. As shown, the remaining characters stored in the Altitude field are "65666749." The Altitude field 1300B, therefore, contains the number "265666749".

FIG. 13C illustrates example UTC Time, Longitude, Latitude, and UTC Date fields 1312, 1314, 1316, and 1318, respectively, and an order barcode 1304. In the illustrated example, the order barcode 1304 encodes the character string "−9876543." During the conversion process 1200, the third receive operation 1260 receives the character string and the third validation operation 1265 determines that the string is readable. In some embodiments, the third validation operation 1265 also determines that the first character of the third data string is a "−" character.

The determine length operation 1270 then determines the number of characters in the third data string. Generally, the determine length operation 1270 does not count any symbol characters indicating that the string is a particular type of barcode, for example, the "−" character indicating an order barcode. In the illustrated example, the third data string has seven characters not including the "−" character. Consequently, the store order length operation 1275 loads a "0" in the first character position of the UTC Time field 1312 and a "7" in the second character position.

In the example shown, the store order operation 1280 loads the characters of the order barcode 1304 following the "−" symbol into predetermined positions in different GPS fields. In particular, the first character in the order barcode 1304, "9", is stored in the LAT_DEG_1 position of the Latitude field 1316. The second character, "8", is loaded into the LAT_MIN_1 position of the Latitude field 1316. The third character, "7", is loaded into the MN_1 of the GPS Time field 1312. Similarly, the fourth, fifth, sixth, and seventh characters are loaded into the SE_1 position of the GPS Time field 1312, the LON_DEG_10 position and LON_DEG_1 positions of the Longitude field 1314, and the YR_10 position of the GPS Date field 1318, respectively.

Using the above-described process, information identifying the subject of a picture and information regarding desired processing of the picture, such as order information, can be directly associated with the digital picture at the time the picture is taken. Furthermore, the identifying information and order information can be inputted in a user-customized format. The user is not restricted to encoding only the type or format of information for which the camera is configured to accept and process.

Figure 14:
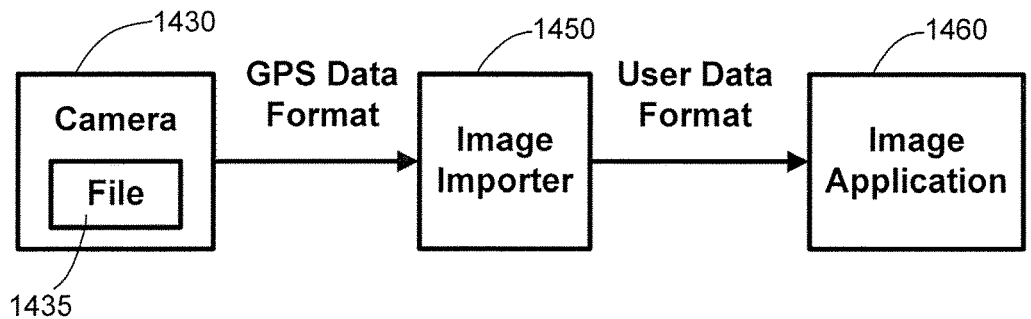
FIG. 14 illustrates a block diagram depicting how GPS metadata is obtained and restored to a useable form according to one embodiment of the present invention.

Referring now to FIG. 14, the data stored with the digital picture files as metadata can be recovered and converted to a useable form for identifying and tracking the pictures. FIG. 14 illustrates a block diagram showing how the GPS string (i.e., or other metadata) is obtained from the image storage file 1435 on the camera 1430 by a data processor 1450. In one embodiment, the data processor 1450 can be the same data processor used to reformat the user data. In another embodiment, the data processor 1450 is a separate data processor. The data processor 1450 converts the data from a format processable by the digital camera 1430 to a useable format. In some embodiments, a useable format is a format readable by a user. In other embodiments, a useable format is a format readable by an image application. Generally, an image application 1460 enables a user to display the picture and to display the metadata in a format readable to the user.

Figure 15:
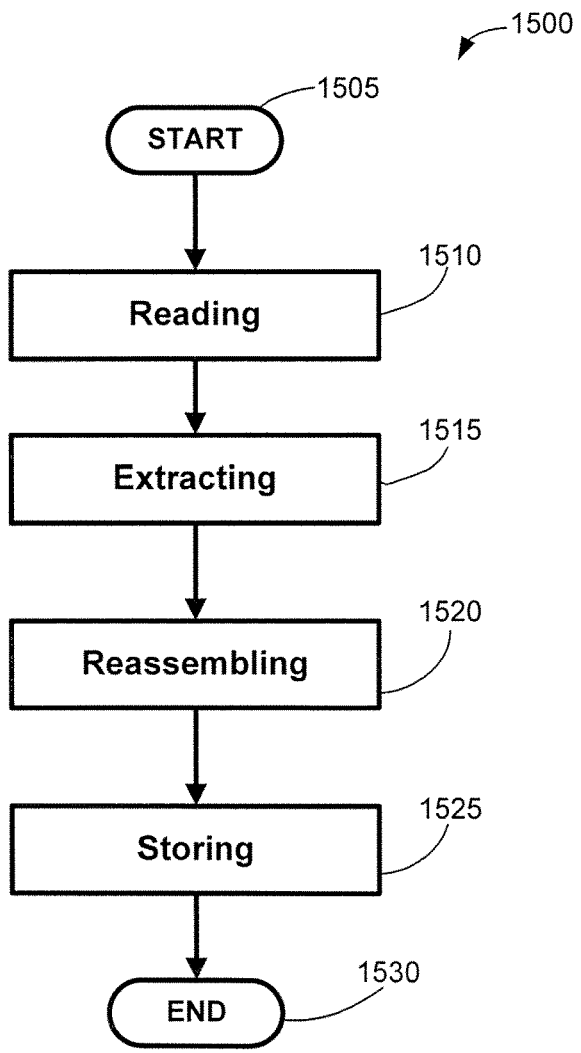
FIG. 15 illustrates an operation flow for a process for obtaining a saved image and the corresponding metadata from a camera and converting the metadata to useable data according to one embodiment of the present invention.

FIG. 15 illustrates an operation flow for an example process 1500 for obtaining the saved image and metadata from the camera and restoring the metadata to a useable format. The process 1500 begins as module 1505 and proceeds to read operation 1510. The read operation 1510 obtains the metadata encoded in a digital image file. In one example embodiment, the read operation 1510 obtains a string of multiple GPS fields from a digital image file.

In some example embodiments, the desired user data is scattered throughout multiple fields of the metadata and not in sequential order. An extract operation 1515 pulls user-entered data from the metadata and an order operation 1520 reassembles any disparate sections of the user data into the proper sequence. A store operation 1525 creates an electronic file to store the user-entered data on a computer or other storage medium other than the digital camera. In some embodiments, the digital image and the user data are stored in a database and organized according to the user data. In one embodiment, the image file can be indexed and searched based on the stored user data. The process 1500 ends at module 1530.

Figure 16:
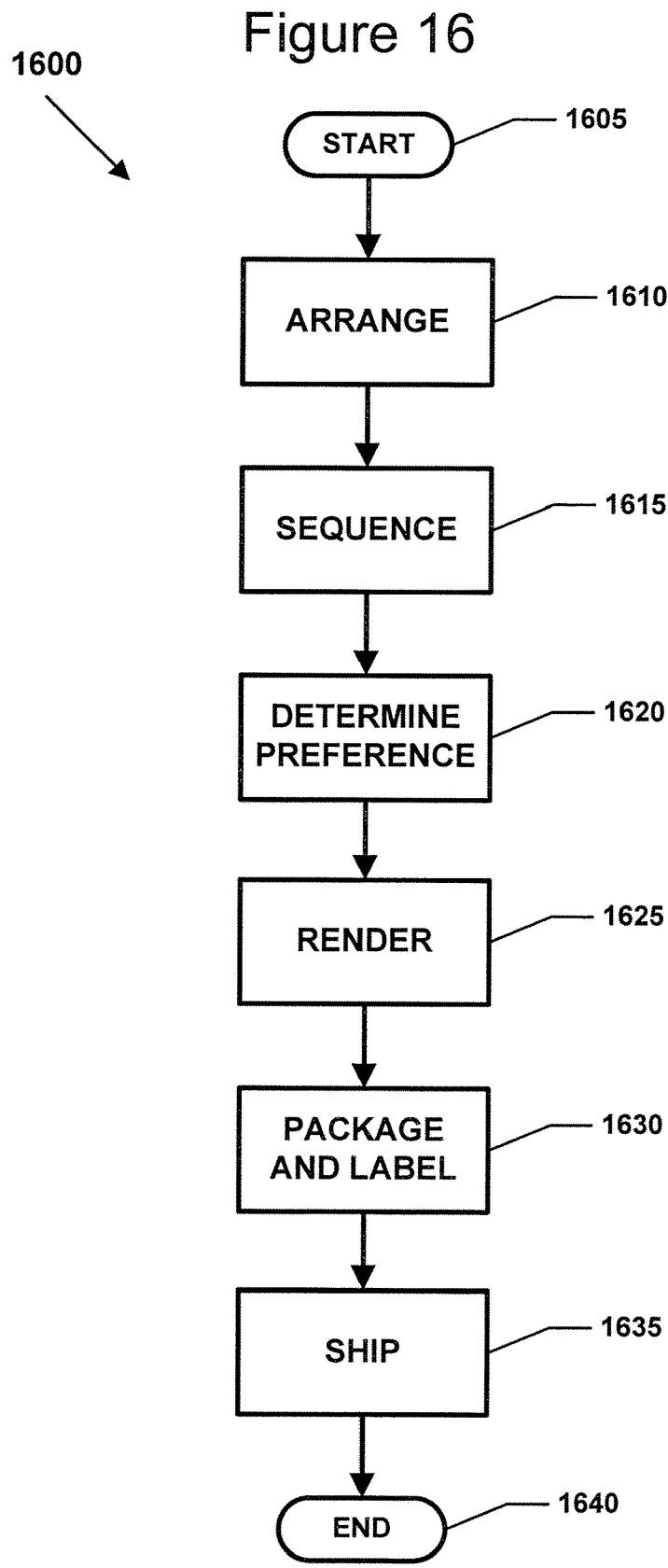
FIG. 16 illustrates an operation flow for a process for processing and delivering a captured image according to organizational data associated with the image.

Referring now to FIG. 16, after restoring the user-customized data, the data is used to process and deliver each captured image to the appropriate customer. FIG. 16 illustrates an operation flow for a process 1600 by which an image is processed and delivered using the restored user-customized data. The process 1600 begins at start module 1605 and proceeds to arrange operation 1610.

The arrange operation 1610 arranges the image files obtained from the digital camera in a particular order. In some embodiments, the arrange operation 1610 organizes the image files within a database. In one example embodiment, the arrange operation 1610 organizes the image files into alphanumerical order based on a job number or reference number associated with the image file. In another example embodiment, the arrange operation 1610 organizes the image files into order first by school, then by homeroom, then by last name, and then by first name. Of course, in other embodiments, the arrange operation 1610 can organize the image files into any order that aids in the production of the image.

A sequence operation 1615 obtains and analyzes the data associated with each image file in sequential order. A determine operation 1620 analyzes the obtained data from sequence operation 1615 to determine the order preference and other production details associated with the image encoded by the image file. For example, in the case of a school portrait, the data obtained from each image file can include, but is not limited to, the name of the subject, subject contact information, school name, school contact information, grade of subject, customer order information, requested finishing techniques, and a delivery date.

A render operation 1625 then prints using standard printing techniques one or more copies of the encoded image based on the order preference. For example, in one embodiment, two "five by seven"-inch pictures and eight wallet-size pictures of the image are printed. In some embodiments, the render operation 1625 modifies the encoded image before printing. For example, different finishing options can be performed on the image. Non-limiting examples of possible finishing options include removing stray hairs, removing "red eye," covering skin blemishes, color tinting, adding backgrounds and borders, and adding text to an image.

A package operation 1630 packages and labels the rendered images in preparation for delivery. In some embodiments, the package operation 1630 places the images in one or more frames, folios, or albums. In other embodiments, the package operation 1630 encodes the images onto a CD. Of course, any suitable packaging method can be used to prepare the rendered images for delivery. A ship operation 1635 sends the packaged photographs to the customer. In one example embodiment, the ship operation 1635 delivers packaged school portraits to a school for distribution to the students. In such an embodiment, each package includes a label identifying the student to whom the package belongs. The process 1600 ends at stop module 1640.

While particular embodiments of the invention have been described with respect to its application, it will be understood by those skilled in the art that the invention is not limited by such application or embodiment or the particular components disclosed and described herein. It will be appreciated by those skilled in the art that other components that embody the principles of this invention and other applications therefore other than as described herein can be configured within the spirit and intent of this invention. The arrangement described herein is provided as only one example of an embodiment that incorporates and practices the principles of this invention. Other modifications and alterations are well within the knowledge of those skilled in the art and are to be included within the broad scope of the appended claims.

What is claimed is:

1. A method of generating a digital image file, the method comprising:
   receiving a digital image of a subject;
   receiving first barcode data;
   receiving second barcode data, at least one of the first barcode data and the second barcode data including information identifying the subject in the digital image;
   storing the first barcode data and the second barcode data in a plurality of metadata fields in the digital image file, wherein at least some of the first barcode data or the second barcode data are fragmented between metadata fields; and
   storing the digital image file in a memory device of a digital camera, wherein the digital image file is a single digital data file encoded in the memory device according to a standard digital image file format.

2. The method according to claim 1, the first barcode data including subject-related data.

3. The method according to claim 2, the subject related data including a name of the subject.

4. The method according to claim 3, the second barcode data including order-related data, the order-related data including an order preference.

5. The method according to claim 1, the metadata fields in the digital image file being global positioning system (GPS) data fields in a GPS data string.

6. The method according to claim 5, further comprising:
   reformatting the first barcode data into a GPS data field datatype; and
   reformatting the second barcode data into the GPS data field datatype.

7. The method according to claim 6, further comprising:
   storing the first barcode data in a first metadata field in the digital image file;
   fragmenting the second barcode data into a first portion, a second portion, and a third portion;
   storing the first portion in a second metadata field in the digital image file;
   storing the second portion in a third metadata field in the digital image file; and
   storing the third portion in a fourth metadata field in the digital image file.

8. The method according to claim 7, wherein storing the first barcode data, storing the first portion, storing the second portion, and storing the third portion uses fewer than an available number of GPS data fields in the GPS data string.

9. The method according to claim 8, further comprising setting unused GPS data fields in the GPS data string to default values.

10. The method according to claim 9, further comprising defining a prefix field of the GPS data string.

11. The method according to claim 10, further comprising:
calculating a checksum based on data in the plurality of GPS data fields; and
storing the checksum in a checksum field of the GPS data string.

12. The method according to claim 8, wherein the first barcode data is stored in a first GPS data field of the GPS data string;
wherein the first portion is stored in a fourth GPS data field of the GPS data string;
wherein the second portion is stored in a sixth GPS data field of the GPS data string; and
wherein the third portion is stored in a seventh GPS data field of the GPS data string.

13. A digital image processing system, comprising:
an image capture device;
at least one processing device; and
at least one memory device, the at least one memory device storing a program which, when executed by the at least one processing device, causes the at least one processing device to:
capture an image with the image capture device;
receive first barcode data from a barcode scanner, the first barcode data including information identifying a subject in the image;
reformat the first barcode data, thereby generating reformatted first barcode data;
store the reformatted first barcode data in a first metadata field in a digital image file;
receive second barcode data from the barcode scanner;
fragment the second barcode data into at least a first portion and a second portion;
reformat the first portion and the second portion, thereby generating a reformatted first portion and a reformatted second portion;
store the reformatted first portion in a second metadata field in the digital image file;
store the reformatted second portion in a third metadata field in the digital image file; and
store the digital image file in the at least one memory device, wherein the digital image file is a single digital data file encoded in the at least one memory device according to a standard digital image file format.

14. The digital image processing system according to claim 13, each of the first metadata field, the second metadata field, and the third metadata field being a global positioning system (GPS) data field in a GPS data string.

15. The digital image processing system according to claim 14, wherein the program, when executed by the at least one processing device, further causes the at least one processing device to:
fragment the second barcode data into a third portion; and
store the third portion in a fourth metadata field,
wherein the second barcode data includes order-related data.

16. The digital image processing system according to claim 15, wherein the program, when executed by the at least one processing device, further causes the at least one processing device to:
set unused GPS data fields in the GPS data string to default values;
define a prefix field of the GPS data string;
calculate a checksum based on data in the plurality of GPS data fields; and
store the checksum in a checksum field of the GPS data string.

17. A method of generating a digital image file of a human subject, the method comprising:
receiving a digital image of the human subject;
receiving first barcode data, the first barcode data including information identifying the human subject in the digital image;
reformatting the first barcode data, thereby generating reformatted first barcode data;
storing the first barcode data in a first global positioning system (GPS) metadata field in the digital image file;
receiving second barcode data, the second barcode data including order-related data;
fragmenting the second barcode data into at least a first portion, a second portion and a third portion;
reformatting the first portion, the second portion, and the third portion, thereby generating a reformatted first portion, a reformatted second portion, and a reformatted third portion;
storing the reformatted first portion in a second GPS metadata field in the digital image file;
storing the reformatted second portion in a third GPS metadata field in the digital image file;
storing the reformatted third portion in a fourth GPS metadata field in the digital image file; and
storing the digital image file in a memory device of a digital camera, wherein the digital image file is a single digital data file encoded in the memory device according to a standard digital image file format.

18. The method according to claim 17, wherein storing the first barcode data, storing the first portion, storing the second portion, and storing the third portion uses fewer than an available number of GPS data fields in a GPS data string, and further comprising:
setting unused GPS data fields in the GPS data string to default values.

19. The method according to claim 18, further comprising:
defining a prefix field of the GPS data string;
calculating a checksum based on data in the plurality of GPS data fields; and
storing the checksum in a checksum field of the GPS data string.

20. The method according to claim 19, wherein the GPS data string includes seven GPS data fields;
wherein the first GPS data field is a first of the seven GPS data fields of the GPS data string;
wherein the second GPS data field is a fourth of the seven GPS data fields of the GPS data string;
wherein the third GPS data field is a sixth of the seven GPS data fields of the GPS data string; and
wherein the fourth GPS data field is a seventh of the seven GPS data fields of the GPS data string.

* * * * *